(12) United States Patent
Gupta et al.

(10) Patent No.: US 11,762,966 B2
(45) Date of Patent: Sep. 19, 2023

(54) METHODS AND DEVICES FOR OPERATIONAL ACCESS GRANTS USING FACIAL FEATURES AND FACIAL GESTURES

(71) Applicant: Motorola Mobility LLC, Chicago, IL (US)

(72) Inventors: Ranjeet Gupta, Naperville, IL (US); Joel Voss, Elhorn, WI (US); Thomas Ubensee, Campinas (BR); Wendel Malta De Assis, Dores de Campos (BR)

(73) Assignee: Motorola Mobility LLC, Chicago, IL (US)

( * ) Notice: Subject to any disclaimer, the term of this patent is extended or adjusted under 35 U.S.C. 154(b) by 367 days.

(21) Appl. No.: 16/838,385

(22) Filed: Apr. 2, 2020

(65) Prior Publication Data

US 2021/0312024 A1 Oct. 7, 2021

(51) Int. Cl.
| | |
|---|---|
| *G06F 21/32* | (2013.01) |
| *H04M 1/72403* | (2021.01) |
| *H04M 1/72463* | (2021.01) |
| *H04M 1/72469* | (2021.01) |
| *G06V 40/16* | (2022.01) |

(52) U.S. Cl.
CPC ............ *G06F 21/32* (2013.01); *G06V 40/174* (2022.01); *H04M 1/72403* (2021.01); *H04M 1/72463* (2021.01); *H04M 1/72469* (2021.01)

(58) Field of Classification Search
USPC ....................................................... 713/186
See application file for complete search history.

(56) References Cited

U.S. PATENT DOCUMENTS

| | | | |
|---|---|---|---|
| 9,182,889 B1* | 11/2015 | Karlo | ............. G06F 3/04817 |
| 9,842,224 B2 | 12/2017 | Alameh et al. | |
| 10,133,304 B2 | 11/2018 | Alameh et al. | |

(Continued)

OTHER PUBLICATIONS

"Is it ture that there a 7 other people in the world, who look exactly like you? If yes how so?", Question Forum Quora; Posted Oct. 16, 2015; available at https://www.quora.com/Is-it-true-that-there-are-7-other-people-in-the-world-who-look-exactly-like-you-If-yes-how-so.

(Continued)

*Primary Examiner* — Matthew Ell
*Assistant Examiner* — Conrad R Pack
(74) *Attorney, Agent, or Firm* — Philip H. Burrus, IV

(57) ABSTRACT

A method in an electronic device includes comparing, with one or more processors, at least one image with one or more predefined reference images and determining whether the at least one image comprises a depiction of a mien expressed by the object. When the object is authenticated as the authorized user of the electronic device and the at least one image fails to comprise the depiction of the mien expressed by the object, the one or more processors grant limited operational access to features, applications, or data of the electronic device. When the object is authenticated as the authorized user of the electronic device and the at least one image comprises the depiction of the mien expressed by the object, the one or more processors can grant full operational access to the features, the applications, or the data of the electronic device.

20 Claims, 11 Drawing Sheets

(56) References Cited

U.S. PATENT DOCUMENTS

| | | | |
|---|---|---|---|
| 10,609,192 B1 | 3/2020 | Agrawal et al. | |
| 2015/0341547 A1 | 11/2015 | Petrescu et al. | |
| 2016/0334943 A1* | 11/2016 | Jeon | G06F 3/0482 |
| 2016/0381014 A1* | 12/2016 | Kim | G06F 1/1616 |
| | | | 726/7 |
| 2017/0041296 A1* | 2/2017 | Ford | G06F 21/64 |
| 2017/0126609 A1* | 5/2017 | Sharifi | G06F 9/542 |
| 2018/0130447 A1* | 5/2018 | Ent | G06F 1/1643 |
| 2018/0335920 A1* | 11/2018 | Tyler | H04M 1/673 |
| 2018/0367656 A1* | 12/2018 | Kim | H04M 1/72454 |
| 2019/0130171 A1 | 5/2019 | Alameh et al. | |
| 2019/0392659 A1* | 12/2019 | Seenivasagam | G07C 9/37 |
| 2020/0026830 A1 | 1/2020 | Alameh et al. | |
| 2020/0029133 A1* | 1/2020 | Gehlsen | H04L 9/0863 |
| 2020/0162895 A1* | 5/2020 | Chakra | H04W 12/30 |
| 2020/0177714 A1* | 6/2020 | Jung | H04M 1/72454 |
| 2020/0238952 A1* | 7/2020 | Lindsay | B60R 21/01 |
| 2021/0049249 A1* | 2/2021 | Falardeau | G06F 21/32 |

OTHER PUBLICATIONS

Chetty, et al., "Multi-Level Liveness Verification for Face-Voice Biometric Authentication" IEEE Published 2006; available at https://ieeexplore.ieee.org/abstract/document/4341615.

Singh, et al., "Face Recognition with Liveness Detection using Eye and Mouth Movement" IEEE Published 2014; https://ieeexplore.ieee.org/abstract/document/6884911.

Chen, et al., "Sensor-Assisted Facial Recognition: An Enhanced Biometric Authentication System for Smartphones" Published Jun. 2014; http://qurinet.ucdavis.edu/pubs/conf/shaxun-mobisys.pdf.

Choi, et al., "A Multimodal User Authentication System Using Faces and Gestures", BioMed Research International Published 2015, Article ID 343475, 8 pages http://dx.doi.org/10.1155/2015/343475.

De Luca, et al., "EyePass—Eye-Stroke Authentication for Public Terminals", CHI 2008, Apr. 5-10, 2008, https://www.aaai.org/Papers/Symposia/Spring/2003/SS-03-08/SS03-08- 017.pdf.

De Luca, et al., "Is Secure and Usable Smartphone Authentication Asking too Much", Published May 2015; http://citeseerx.ist.psu.edu/viewdoc/download?doi=10.1.1.697.1054&rep=rep1&type=pdf.

Hollister, Sean, "iPhone X: How Face ID works", Article Published on CNet Sep. 20, 2017; https://www.cnet.com/news/apple-face-id-truedepth-how-it-works/.

Shukran, et al., "Kinect-based Gesture Password Recognition", Australian Journal of Basic and Applied Sciences, 6(8): 492-499, Published 2012 ISSN 1991-8178; http://pdfs.semanticscholar.org/995d/fec5c9bd1acf74e6e82c88bb2d06d153bab 6.pdf.

Tran, et al., "Automatic Detecting Neutral Face for Face Authentication and Facial Expression Analysis", AAAI Technical Report SS-03-08. Compilation copyright ® 2003, AAAI (www.aaai.org).

Xie, Pengqing, "Facial movement based human user authentication", Graduate Theses and Dissertations. 14267 Published 2014; Available at https://lib.dr.iastate.edu/etd/14267.

* cited by examiner

METHODS AND DEVICES FOR OPERATIONAL ACCESS GRANTS USING FACIAL FEATURES AND FACIAL GESTURES

BACKGROUND

Technical Field

This disclosure relates generally to electronic devices, and more particularly to user authentication in electronic devices.

Background Art

Modern portable electronic devices, such as smartphones and tablet computers, are advanced computing devices. In addition to being able to make voice calls and send text or multimedia messages, these devices are capable of executing financial transactions, recording, analyzing, and storing medical information, storing pictures and videos, maintaining calendar, to-do, and contact lists, and even performing personal assistant functions. To perform such a vast array of functions, these devices sometimes store "private" data about the user. This private data may include data relating to their location, financial status, travels, health status, activities, friends, and more.

With such personal information stored in the device, it is desirable to ensure that only the user—or those authorized by the user—have access to this data. At the same time, it is desirable to provide for a simple, quick, and easy user interface that allows for quick access to the device. It would be advantageous to have an improved system for authenticating a person as an authorized user of an electronic device, as well as for granting access to different types of data, applications, and other features of an electronic device.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
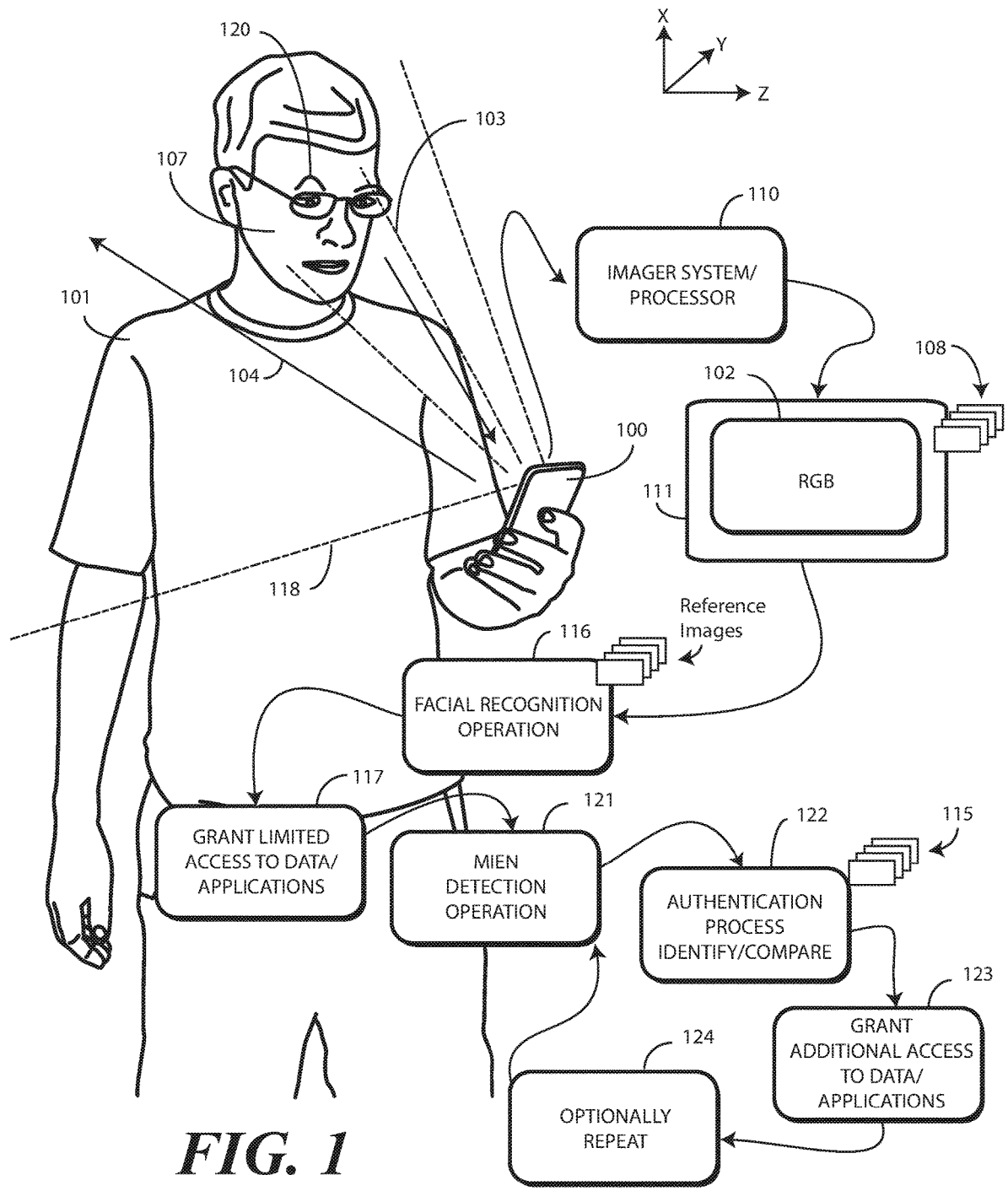
FIG. 1 illustrates one explanatory system and method in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to methods and systems for employing a combination of facial recognition and facial gesture, or "mien," detection to authenticate a person as an authorized user of an electronic device and optionally to grant selective operational access to the electronic device. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of using combinations of facial recognition and mien detection as described herein. The non-processor circuits may include, but are not limited to, a radio receiver, a radio transmitter, signal drivers, clock circuits, power source circuits, and user input devices. As such, these functions may be interpreted as steps of a method to grant access to the features, applications, or data of the electronic device.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about" or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide methods and systems for using a combination of facial recognition and mien identification to authenticate a person as an authorized user of an electronic device and allow access to the information, applications, and features of the electronic device. This combination of facial and mien recognition can be used to grant varying levels of operational access to the electronic device. For example, in one or more embodiments a simple facial recognition process can be used to make some information of the electronic device, e.g., a notification generated by a predefined application operating on one or more processors of the electronic device. By contrast, other information, such as more personal information or private information, may remain inaccessible until the authorized user expresses one or more predefined miens that are detected by the one or more processors via one or more sensors of the electronic device. Advantageously, this embodiment helps to reduce labor and inconvenience associated with having to perform the predefined mien each and every time the authorized user engages with the electronic device, while still adding an extra layer of security in the form of the mien requirement to protect private, secure, or personal information.

Illustrating by example, in one or more embodiments an image captures at least one image of an object. One or more processors operable with the imager compare the at least one image with one or more predefined reference images stored in a memory of the electronic device or in a cloud device accessible to the electronic device. The one or more processors can determine, by comparing the at least one image to the one or more predefined reference images whether the at least one images comprises a depiction of a mien expressed by the object.

In one or more embodiments, the one or more processors can further, by comparing the at least one image to the one or more predefined reference images, authenticate the object as an authorized user of the electronic device when the at least one image sufficiently corresponds to the one or more predefined images. In one or more embodiments, when the object is authenticated as the authorized user of the electronic device and the at least one image fails to comprise the depiction of the mien expressed by the object, the one or more processors grant limited operational access to features, applications, or data of the electronic device. For example, the one or more processors may only grant access to notifications generated by one or more predefined applications operating on one or more processors of the electronic device.

However, when the object is authenticated as the authorized user of the electronic device and the at least one image comprises the depiction of the mien expressed by the object, in one or more embodiments the one or more processors grant full operational access to the features, the applications, or the data of the electronic device. Thus, an authorized user can express a mien while being authenticated to unlock personal information such as data relating to their location, financial status, travels, health status, activities, friends, and more.

In still another embodiment, a combination of facial recognition and mien detection can be used to authenticate a person as an authorized user of an electronic device and/or grant access to features, applications, or data of the electronic device. In this alternate embodiment, an imager continually captures a plurality of images of an object, with that plurality of images being stored in a circular buffer. As more recent images of the plurality of images are captured and added to the circular buffer, they replace less recent images of the plurality of images in the circular buffer.

In one or more embodiments, one or more processors of the electronic device perform a facial recognition operation by searching for a predefined mien within the plurality of images stored within the circular buffer. Said differently, in one or more embodiments the one or more processors monitor the various images stored within the circular buffer for a predefined mien. This can occur, for example, by comparing at least one image of the plurality of images with one or more predefined reference images to determine whether the at least one image sufficiently corresponds to the one or more predefined reference images. The one or more processors can also perform mien detection. However, in one or more embodiments the mien detection is triggered when movement of the object is detected from images of the circular buffer.

Illustrating by example, in one or more embodiments the one or more processors determine whether there is movement of the object between at least two images of the plurality of images stored in the circular buffer. Where no movement is detected, in one or more embodiments mien detection is omitted, thereby leaving private and personal information safely secured within the electronic device. However, in one or more embodiments when the one or more processors detect movement of the object between at least two images of the plurality images, and in one embodiment only when the one or more processors detect movement of the object between at least two images of the plurality images, the one or more processors perform a mien detection operation on one or more images of the plurality of images to determine whether the one or more images comprise a depiction of a predefined mien expressed by the object.

In one or more embodiments, when the at least one image sufficiently corresponds to the one or more predefined reference images and the one or more images fail to comprise the depiction of the predefined mien expressed by the object, the one or more processors grant only limited operational access to features, applications, or data of the electronic device. By contrast, when the at least one image sufficiently corresponds to the one or more predefined reference images and the one or more images comprise the depiction of the predefined mien expressed by the object, in one or more embodiments the one or more processors grant additional, or alternatively full, operational access to the features, the applications, or the data of the electronic device.

In yet other embodiments, a combination of facial recognition and mien detection can be used to authenticate a person as an authorized user of an electronic device and to select between features, applications, or data of the electronic device. In one or more embodiments, an imager captures a plurality of images of an object. The plurality of images can optionally be stored in a circular buffer, with more recent images of the plurality of images replacing less recent images of the plurality of images in the circular buffer.

The one or more processors can compare at least one image of the plurality of images with one or more predefined reference images to perform a facial recognition operation that determines whether the at least one image of the plurality of images sufficiently matches the one or more predefined reference images. The one or more processors can also perform a mien detection operation on one or more images of the plurality of images to determine whether the one or more images comprise a depiction of one or more predefined miens expressed by the object.

In one or more embodiments, when the at least one image sufficiently corresponds to the one or more predefined reference images so as to authenticate the object as an authorized user of the electronic device, an application, feature, function, group of functions, or data of the electronic device can be selected, authorized, and/or accessed as a function of an identified mien. For example, where the one or more images comprise a depiction of a first predefined mien expressed by the object, the one or more processors may grant a first level of operational access to the features, applications, or data of the electronic device. By contrast, when the one or more images comprise a depiction of a second predefined mien expressed by the object, the one or more processors may grant a second level operational access to the features, applications, or data of the electronic device. Thus, an authorized user may gain access to a financial application, for example, by expressing a first mien. Likewise, the authorized user may gain access to a health application by expressing a second mien, and so forth. Alternatively, the authorized user may gain access to a first group of applications restricted at a first security level by expressing the first mien, while gaining access to a second group of applications restricted at a second security level by expressing the second mien, and so forth.

Advantageously, embodiments of the disclosure allow an authorized user to quickly and easily gain access to different types of information stored within an electronic device. For example, if the electronic device contains public and private information, or public information and various levels of private information, in one or more embodiments the public information becomes available to the authorized user using simple facial recognition. By contrast, the private information becomes available to the authorized user only after the authorized user expresses a predefined mien that is detected by the one or more processors. Alternatively, where there are various levels of private information, in one or more embodiments these levels can become available to the authorized user upon the authorized user expressing a series of predefined miens. As noted above, in some embodiments the authorized user can select subsets of the private information by expressing different types of miens.

Advantageously, embodiments of the disclosure that combine the use of facial recognition and mien detection authenticate users and allow access data as a combination of their facial features, i.e., what they are, and a gesture expressed using those facial features, i.e., something they know. This combination of something they are and something they know advantageously allows electronic devices configured in accordance with embodiments of the disclosure to better distinguish between siblings (especially when young), and makes it easier to distinguish between adults that generally look alike.

Embodiments of the disclosure allow an authorized user to keep private information locked an unavailable during the commission of crimes. For example, if an authorized user is being mugged with the miscreant demanding the authorized user unlock the electronic device, the authorized user can simply present their face to the imager without expressing the mien, thereby leaving their private information sound and secure.

Embodiments of the disclosure help to reduce the instances of false authentication that can occur when facial recognition is used alone. Embodiments of the disclosure can also reduce the cost of complex authentication systems by relying only upon an imager without requiring any additional depth scanner or thermal sensors. Embodiments of the disclosure can also advantageously help to authenticate a person as an authorized user of an electronic device when facial recognition alone may be difficult, e.g., when the person is wearing a scarf or sunglasses that partially obscure their face. This list of advantages is illustrative only. Numerous other advantages offered by embodiments of the disclosure will be obvious to those of ordinary skill in the art having the benefit of this disclosure.

In one embodiment where an imager captures images of a person, and an authentication system authenticates a person as an authorized user or owner of an electronic device using facial recognition. When this occurs, a first permission level of operational access is granted to that user. The user may be able to use features such as a telephone application, a calculator application, a web browsing application, and so forth.

However, in one or more embodiments the user, having only limited operational access to the features, applications, or data of the electronic device, may not be able to see private information such as photographs, calendar data, contacts lists, financial information, or health information. They may not be able, for example, to access social media applications as well. They may not, for instance, be able to make voice calls using cellular data, and may instead be relegated to only making calls when the electronic device is in communication with a Wi-Fi network, and so forth. It should be noted that these limited operational access examples are illustrative only.

In one or more embodiments, once this limited operational access to the features, applications, and/or data is granted, one or more additional images of the user are captured. In one or more embodiments, the one or more processors then determine whether the user is expressing a predefined mien in these additional images. Examples of predefined miens include predefined facial expressions, such as one eye open, both eyes closed, a tongue sticking out, or biting a lip, or objects touching the face such as a finger or hand. Other examples of predefined miens will be described in more detail below. Still others will be obvious to those of ordinary skill in the art having the benefit of this disclosure.

Once a predefined mien is detected, as confirmed by the one or more processors by comparing the detected miens to one or more predefined authentication references, the one or more processors of the electronic device can grant additional operational access to the features, applications, and/or data of the electronic device. In addition to being able to use the telephone application on the Wi-Fi network for example, the additional operational access may include allowing the user to make voice calls on a cellular network, allowing access to the contacts list, and so forth.

In one embodiment an authentication system of the electronic device performs a simple authentication process by capturing, with an imager, at least one image of an object. One or more processors of the electronic device can then compare the at least one image with one or more predefined reference images. Where the at least one image sufficiently corresponds to at least one of the one or more predefined reference images, the one or more processors can initially authenticate the object as a user authorized to use the electronic device, and can grant only a limited operational access to features, applications, or data of the electronic device.

Following this grant of the limited operational access, the authentication system can then capture additional images of the authorized user. The one or more processors can compare the additional images with one or more predefined authentication references to determine whether the authorized user is expressing a predefined mien. In one or more embodiments, when the authorized user is expressing an identifiable mien, the one or more processors can grant additional operational access to the features, applications, or data of the electronic device.

In one or more embodiments, the operational access granted can be at two different levels. Illustrating by example, when facial recognition only is performed, in one or more embodiments an initial operational access is granted. This initial operational access may grant access to the operating system of the electronic device. This may unlock the device and reveal user actuation targets along the display representing various applications, files, folders, and data repositories operating on the electronic device. In one or more embodiments, however, various applications may require the authorized user to express a predefined mien before access to these folders is permitted. A calculator application may have no such requirement, while a financial or health application may require a predefined mien expressed by the authorized user match an authentication reference before either can be accessed.

As noted above, in one or more embodiments each folder, application, data, or feature of the electronic device can be locked with its own predefined mien. To access the financial application, for example, the authorized user may have to express a first mien, such as closing one eye. To access the health application, by contrast, the authorized user may have to express a second mien, such as sticking out their tongue, and so forth.

Thus, in one or more embodiments the requirement of mien expression is associated with specific applications. If a user launches a "high security" application, such as a financial or medical application, the application itself can perform the mien detection process using the one or more processors. If, for some reason, the one or more processors fail to properly identify the mien being expressed by the authorized user, the one or more processors can require an alternate authenticator, such as an iris scan or entry of a personal identification number (PIN).

Advantageously, embodiments of the disclosure allow a person to express a mien to select and/or access private or secure information stored in the electronic device. For instance, the person can deliberately raise one or more eyebrows, intentionally close one or more eyes, touching their face with fingers, open or close their mouth, make an exaggerated "happy" or "sad" face, brush their hair into a particular style, bite their lip, stick out their tongue, open their mouth, and so forth. Alternatively, the authorized user may blink, open and close their mouth, raise and lower their eyebrows, change their posture, or move their head relative to the neck, and so forth. This mien, known only to the user, prevents a would-be user from attempting to gain access to the device using, for example, a three-dimensional mask of the true authorized user's countenance.

Turning now to FIG. 1, illustrated therein is one explanatory electronic device 100 configured in accordance with one or more embodiments of the disclosure. Also shown in FIG. 1 are one or more method steps for the electronic device 100.

In FIG. 1, a user 101 is initially authenticating himself as an authorized user of the electronic device 100 via facial recognition to gain limited operational access to features, services, applications, data, content, or other properties of the electronic device 100 in accordance with one or more embodiments of the disclosure. In this illustrative embodiment, the user is initially authenticated using an imaging process where images of the user 101 are captured by an imager 102. When this occurs, and when the user 101 is authenticated as an authorized user of the electronic device 100 at step 116, in one or more embodiments one or more processors 110 of the electronic device 100 can grant a limited operational access to the electronic device 100 at step 117.

In one or more embodiments, the limited operational access granted at step 117 comprises a privacy mode of operation. In one or more embodiments, a privacy mode of operation limits or restricts access to at least some information via a user interface of the electronic device 100. The privacy mode of operation can preclude private information from being annunciated from a loudspeaker or presented on the display of the electronic device 100. In one or more embodiments, the privacy mode of operation may preclude the presentation of any personal data at the user interface of the electronic device 100. This may preclude the annunciation of personal data from audible outputs or the presentation of personal data on the display.

In one embodiment, when in the privacy mode of operation the one or more processors 110 will present an alert of incoming messages on the display of the electronic device 100, while precluding the content of messages from being presented on the display. In another embodiment, the one or more processors 110 can disable the display of some or all text messages or chat messages when operating in the privacy mode of operation. In another embodiment, the one or more processors 110 can lock the display when operating in the privacy mode of operation.

In yet another embodiment, the one or more processors 110 can allow access to non-sensitive information, such as Internet search engines, while precluding access to sensitive or private information, such as electronic mail, when operating in the privacy mode of operation. Accordingly, when operating in the privacy mode of operation, the one or more processors 110 may allow access to non-sensitive applications while protecting sensitive and/or private applications.

In yet another embodiment, the one or more processors 110 may override location sensors and beacons when operating in the privacy mode of operation. In another embodiment, the one or more processors 110 may present or read message and electronic mail subjects only on the display, while preventing the presentation or reading of message or electronic mail content when operating in the privacy mode of operation. In another embodiment, the one or more processors 110 may present only a sneak preview of incoming messages on the display when operating in the privacy mode of operation. In another embodiment, the one or more processors 110 may not present detailed message announcements when operating in the privacy mode of operation.

In still another embodiment, the one or more processors 110 may take other actions when operating in a privacy mode of operation. Accordingly, these examples above of privacy modes operation are illustrative only. Others will be readily obvious to those of ordinary skill in the art having the benefit of this disclosure.

For example, the limited operational access may unlock the electronic device 100, thereby allowing the user 101 to use the operating system and some features of the electronic device 100. These features can include those that do not employ personal data, such as a telephone application without any address book or contact list, a calculator application, a web browsing application without any bookmarks, browsing history, or preferred links, and so forth. However, in one or more embodiments the user 101, having only limited operational access to the features, applications, or data of the electronic device 100, may not be able to see private information such as photographs, calendar data, contacts lists, financial information, or health information. The user 101 may not be able, for example, to access social media applications that include personal communications. The user 101 may not be able to access financial applications that include personal financial data. The user 101 may not be able to access health applications that utilize personal health data, and so forth.

Similarly, in still other embodiments, a single application may have both a normal mode of operation and a privacy mode of operation as well. Illustrating by example, in one or more embodiments an image capture application may have a privacy mode of operation in which images can be captured and stored. By contrast, the normal mode of operation of the image capture application may allow captured images to be shared with friends listed in a contact list. Accordingly, in one or more embodiments the normal mode of operation and the privacy mode of operation can be applied at the application level rather than the device level. To illustrate by way of another example, a web browser application may have a privacy mode that allows web pages to be accessed, while a normal mode of operation includes the presentation of a search history, bookmarks, and so forth. Other examples of how the normal mode of operation and privacy mode of operation can be applied at the application level will be obvious to those of ordinary skill in the art having the benefit of this disclosure.

In this illustrative embodiment, an imager 102 captures at least one image 103 of an object situated within a predefined radius 104 of the electronic device 100, which in this case is the user 101. In one embodiment, the imager 102 captures a single image 103 of the object. In another embodiment, the imager 102 captures a plurality of images 103,118 of the object. As will be described in more detail below with reference to FIG. 8, in one or more embodiments the plurality of images 103,118 can be stored in a circular buffer situated within a memory of the electronic device 100. As more recent images of the plurality of images 103,118 are captured and added to the circular buffer, they replace less recent images of the plurality of images in the circular buffer in one or more embodiments.

In one or more embodiments, the one or more images 103 are each a two-dimensional image. For example, in one embodiment the image 103 is a two-dimensional RGB image. In another embodiment, the image 103 is a two-dimensional infrared image. Other types of two-dimensional images will be obvious to those of ordinary skill in the art having the benefit of this disclosure.

In one or more embodiments, the image 103 can be compared to one or more predefined reference images 108 to determine whether the image 103 sufficiently corresponds to the one or more predefined reference images 108 to authenticate the user 101 as an authorized user of the electronic device 100 in a facial recognition operation. By making such a comparison, one or more processors 110 can confirm whether the shape, skin tone, eye color, hair color, hair length, and other features identifiable in a two-dimensional image are that of the authorized user identified by the one or more predefined reference images 108.

In one or more embodiments, the image 103 and/or the plurality of images 103,118 are used for initial authentication purposes in a facial recognition operation performed at step 116. Illustrating by example, in one or more embodiments step 116 includes one or more processors 110 comparing the image 103 with the one or more predefined reference images 108. The initial authentication of step 116 will fail in one or more embodiments unless the image 103 sufficiently corresponds to at least one of the one or more predefined reference images 108.

As used herein, "sufficiently" means within a predefined threshold. For example, if one of the predefined reference images 108 includes five hundred reference features, such as facial shape, nose shape, eye color, background image, hair color, skin color, and so forth, the image 103 will sufficiently correspond to at least one of the one or more predefined reference images 108 when a certain number of features in the image 103 are also present in the predefined reference images 108. This number can be set to correspond to the level of security desired. Some users may want ninety percent of the reference features to match, while other users will be content if only eighty percent of the reference features match, and so forth.

Where the initial facial recognition authentication of step 116 is successful, i.e., where the at least one image 103 sufficiently corresponds to at least one of the one or more predefined reference images 108, step 116 includes authenticating the object as a user authorized to use the electronic device 100. Where this occurs, in one or more embodiments step 117 comprises granting limited operational access to features, applications, data, services, or other benefits of the electronic device 100. For instance, in response to successful facial recognition being performed at step 116, step 117 may grant access to the operating system of the electronic device 100. This may unlock the electronic device 100 and reveal user actuation targets along the display representing various applications, files, folders, and data repositories operating on the electronic device 100.

For example, with the limited operational access, the user 101 may be able to access non-personal data, such as by browsing the Internet, and may be able to access applications that do not include personal data, such as games. However, with the limited operational access the user 101 may not be able to see pictures stored on the electronic device 100, electronic mail, messages, and other information stored on the electronic device. Additionally, the user 101 may not be able to access health or financial applications or data operating on or stored in the electronic device 100. Thus, the user 101 will initially only be able to use a limited subset of one or more of services, applications, data, or features of the electronic device 100 when only limited operational access has been granted.

After this, however, step 121 can include performing, by one or more processors 110 of the electronic device 100, a mien detection operation using one or more images of the plurality of images 103,118 to determine whether the one or more images of the plurality of images 103,118 comprise a depiction of a predefined mien expressed by the user 101. The predefined mien can be identified by comparing detected miens in the plurality of images 103,118 to one or more predefined authentication references 115 at step 122, which include depictions of miens associated with the user 101 in one or more embodiments.

As used herein, "mien" takes the ordinary English definition of a person's look or manner, especially one of a particular kind indicating their character or mood. As used with the authentication system, a mien is an intentional facial or bodily pose or position in which the user places their face or body, and serves as an additional authentication factor for step 122.

Illustrating by example, rather than staring blankly at the electronic device 100 for authentication, in one or more embodiments the user 101 can adopt a particular mien intentionally as a secret authentication factor for step 122. In one or more embodiments, the user 101 is the only one who knows what the mien is. In one or more embodiments, grants of additional operational access to the features, applications, data, or services of the electronic device 100 at step 123 do not occur unless the mien is expressed. Accordingly, in one or more embodiments the grant of additional operational access to features, applications, services, or data of the electronic device 100 at step 123 occurs only where the user 101 is expressing a predefined mien as identified at step 122.

Examples of miens include one of one or more raised eyebrows, one or more closed eyes, one or more fingers touching a face or in front of the face, forcing the mouth open, closing the mouth with a smile or frown, making an intentionally happy face, making an intentionally sad face, pulling the hair, or orienting the face 107 in a particular direction, such as a profile view. Other examples of miens include looking up or looking down or standing in front of a structure, a door, a car, in bright light, and so forth. Other examples of miens will be obvious to those of ordinary skill in the art having the benefit of this disclosure.

In the illustrative embodiment of FIG. 1, the user 101 is expressing a mien by raising one eyebrow 120 higher than the other. This is identified at step 122 by comparing, for example, either one or more of the plurality of images 103,118 to one or more additional predefined authentication references 115. In one or more embodiments, the grant of additional operational access to features, applications, services, or data of the electronic device 100 at step 123 is granted only when the mien sufficiently corresponds to a predefined mien defined by the predefined authentication references 115 stored in memory of, or accessible by, the electronic device 100.

In one or more embodiments, when the at least one image 103 sufficiently corresponds to the one or more predefined reference images 108 and the one or more images of the plurality of images 103,118 comprise the depiction of the predefined mien expressed by the user, step 123 can comprise, granting, by the one or more processors 110 of the electronic device 100, full operational access to the features, the applications, or the data of the electronic device 100. The additional operational access can take a variety of forms.

Illustrating by example, if the limited operational access granted at step 117 were a privacy mode of operation, for example, in one or more embodiments the full operational access granted at step 123 comprises granting access to the normal mode of operation of the electronic device 100. If the limited operational access granted at step 117 allowed access only to one or more notifications generated by one or more predefined applications operating on the one or more processors 110 while precluding access to interactive application portals of the one or more predefined applications operating on the one or more processors 110, the full operational access granted at step 123 may allow access to the interactive application portals of the one or more predefined applications operating on the one or more processors 110 as well. In another embodiment, in addition to being able to use the telephone application on the Wi-Fi network, the additional operational access may include allowing the user 101 to make voice calls on a cellular network, allowing access to the contacts list, and so forth.

In one or more embodiments, the predefined mien or miens (multiple miens can be used in some embodiments as will be described below with reference to FIG. 7) are user-definable. Additionally, the operational access granted in response to a mien can be user definable using a settings application of the electronic device 100 in one or more embodiments. Thus, the user 101 may define a first mien, e.g., sticking out their tongue, to cause the one or more processors 110 to grant full access to the features, applications, or data of the electronic device 100. By contrast, closing one eye may allow some additional operational access to be granted by the one or more processors, while keeping other information, data, features, and so forth private. Accordingly, the mien detection process can optionally repeat at step 124 to grant additional levels of operational access to the electronic device 100 with the expression of additional miens. In one or more embodiments, the user 101 may have to express multiple miens prior to the one or more processors granting access to, for example, sensitive personal data. It should be noted that the user 101 can define the predetermined number of times that step 124 repeats steps 121-123 in one or more embodiments.

Thus, operational access to other data, features, or applications may require the user 101 to express a mien in addition to being authenticated using facial recognition at step 116. A calculator application may have no such requirement, while a financial or health application may require the user 101 to express one or more miens before they can be accessed.

In one or more embodiments, when the facial recognition occurring at step 116 fails, for whatever reason, the one or more processors 110 can lock the electronic device 100. Alternatively, the one or more processors 110 can or limit access the electronic device 100 in accordance with the initial, limited operational access granted at step 117 to preclude access to certain applications or sensitive or personal information stored therein.

When the electronic device 100 is locked, the one or more processors 110 may then require additional authentication inputs or factors, such as prompting the user 101 to type, speak or look into imager, or may require the user 101 to express a predefined mien that substantially matches the predefined authentication references 115 at step 122 to perform the basic authentication at step 116 to authenticate the user 101 at the next authentication cycle.

As noted above, in one embodiment the imager 102 captures a single image 103 of the user 101, while in other embodiments the imager 102 captures a plurality of images 103,118 of the user 101. In one or more embodiments, the use of a plurality of images 103,118 advantageously allows for the detection of movement, which can be used to trigger the mien detection operation of step 121. In one or more embodiments, the mien detection operation performed at step 121 occurs only where there is movement of the user 101 between at least two images of the plurality of images 103,118. Where there is, in one or more embodiments the one or more processors 110 perform the mien detection operation at step 121 on one or more images of the plurality of images 103,118 to determine whether the one or more images comprise a depiction of a predefined mien expressed by the user 101.

The mien detection operation of step 121 can be triggered in other ways as well. As will be explained in more detail below with reference to FIG. 4, in another embodiment user input actuating an application using private information or requesting access to private data can be used to trigger the mien detection operation. Other examples of mien detection operation triggers will be obvious to those of ordinary skill in the art having the benefit of this disclosure.

The combination of facial recognition and mien detection can be utilized in a variety of ways. For example, in one or more embodiments when the at least one image sufficiently corresponds to the one or more predefined reference images 108 (facial recognition) and the one or more images fail to comprise the depiction of the predefined mien expressed by the user 101 (no mien detection), the one or more processors 110 grant only limited operational access to features, applications, or data of the electronic device. However, when the at least one image sufficiently corresponds to the one or more predefined reference images 108 (facial recognition) and the one or more images comprise the depiction of the predefined mien expressed by the user (mien detection), the one or more processors 110 grant full operational access to the features, the applications, or the data of the electronic device in one or more embodiments.

The requirement of expression of a mien prior to granting access to personal information or data prevents nefarious actors from making a three-dimensional model or mask of the user 101 in an attempt to grant access to the information stored in the electronic device 100. Advantageously, requiring the user 101 to express something they know, e.g., a mien, in addition to something they are, i.e., the features of their face, precludes such acts of nefariousness facilitating access to private or personal information.

In one or more embodiments, the facial recognition process of step 116 is performed on an image captured prior to any images captured for use in the mien detection process of step 121. As noted above, in one or more embodiments when a plurality of images 103,118 is captured, these images can be stored in a circular buffer of the electronic device 100. In one or more embodiments, more recent images of the plurality of images replaced less recent images in the plurality of images 103,118 stored in the circular buffer.

When performing the facial recognition process of step 116, in one or more embodiments the one or more processors 110 use an image taken before images used in the mien detection process of step 121. Said differently, when the one or more processors 110 compare at least one image of the plurality of images 103,118 with one or more predefined reference images 108, and also determine whether there is movement of the user 101 between at least two images of the plurality of images 103,118 as a trigger function for the mien detection performed at step 121, in one or more embodiments the at least one image occurs, i.e., is captured, before the one or more images of the plurality of images 103,118.

This two-step process allows the user 101 to be facially authenticated at step 116 before expressing the mien to grant additional access at step 121. Thus, in one or more embodiments the one or more processors 110 perform the mien detection operation on one or more images of the plurality of images 103,118 at step 121 only when the depiction of the predefined mien is absent from the at least one image of the plurality of images 103,118 used for the facial recognition process of step 116.

In one or more embodiments, the use of the plurality of images 103,118 allows step 122 to confirm whether there is motion between instances of the plurality of images 103,118. In one or more embodiments, the authentication process of step 122 requires movement of the user 101 between instances of the plurality of images 103,118 prior to granting additional operational access at step 123.

This motion requirement allows a user to selectively trigger the mien detection operation of step 121 by expressing a mien after being authenticated as an authorized user of the electronic device 100 by facial recognition in one or more embodiments. For example, the user 101 may make a change in facial expression to trigger the mien detection operation of step 121. The user 101 may initially have an open mouth in a first instance of the plurality of images 103,118, while having a closed mouth in a second instance of the plurality of images 103,118.

Another example of movement used to trigger the mien detection operation of step 121 may be touching an initially untouched cheek. Another example may be closing one or both eyes after having them initially open. Another example might be removing the user's glasses between instances of the plurality of images 103,118. Still another example might be blowing out one's cheeks between instances of the plurality of images 103,118. These are illustrations only, as other examples of movement used to trigger mien detection will be obvious to those of ordinary skill in the art having the benefit of this disclosure.

Accordingly, in one or more embodiments motion between instances of the plurality of images 103,118 is required to trigger the mien detection process of step 121. In one or more embodiments, the one or more processors 110 determine whether there is movement of the object between at least a first image 103 and a second image 118 of the plurality of images 103,118. When there is, in one or more embodiments mien detection is triggered.

Figure 2:
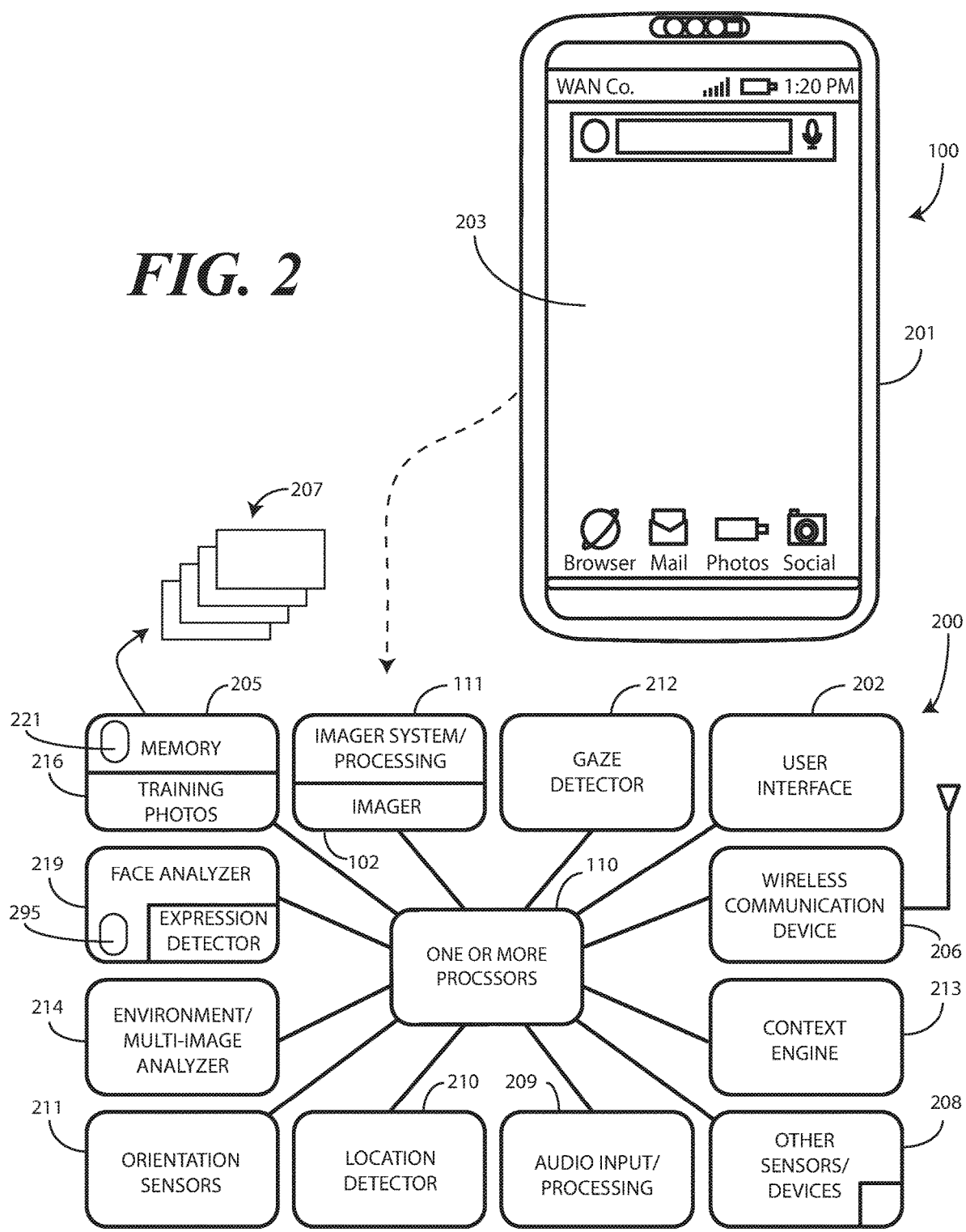
FIG. 2 illustrates one explanatory electronic device in accordance with one or more embodiments of the disclosure.

Turning now to FIG. 2, illustrated therein is one explanatory block diagram schematic 200 of one explanatory electronic device 100 configured in accordance with one or more embodiments of the disclosure. The electronic device 100 can be one of various types of devices. In one embodiment, the electronic device 100 is a portable electronic device, one example of which is a smartphone that will be used in the figures for illustrative purposes. However, it should be obvious to those of ordinary skill in the art having the benefit of this disclosure that the block diagram schematic 200 could be used with other devices as well, including conventional desktop computers, palm-top computers, tablet computers, gaming devices, media players, wearable devices, or other devices. Still other devices will be obvious to those of ordinary skill in the art having the benefit of this disclosure.

In one or more embodiments, the block diagram schematic 200 is configured as a printed circuit board assembly disposed within a housing 201 of the electronic device 100. Various components can be electrically coupled together by conductors or a bus disposed along one or more printed circuit boards.

The illustrative block diagram schematic 200 of FIG. 2 includes many different components. Embodiments of the disclosure contemplate that the number and arrangement of such components can change depending on the particular application. Accordingly, electronic devices configured in accordance with embodiments of the disclosure can include some components that are not shown in FIG. 2, and other components that are shown may not be needed and can therefore be omitted.

The illustrative block diagram schematic 200 includes a user interface 202. In one or more embodiments, the user interface 202 includes a display 203, which may optionally be touch-sensitive. In one embodiment, users can deliver user input to the display 203 of such an embodiment by delivering touch input from a finger, stylus, or other objects disposed proximately with the display 203.

In one embodiment, the electronic device includes one or more processors 110. In one embodiment, the one or more processors 110 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the block diagram schematic 200. Each of the application processor and the auxiliary processor(s) can be configured to process and execute executable software code to perform the various functions of the electronic device with which the block diagram schematic 200 operates.

A storage device, such as memory 205, can optionally store the executable software code used by the one or more processors 110 during operation. In one or more embodiments, the memory 205 comprises a circular buffer 221. A predetermined number of images—used for one or both of facial recognition and/or mien detection—can be stored in the circular buffer 221. In one or more embodiments, a last-in-first-out inventory method is used in the circular buffer 221, with a most recent image of the plurality of images stored in the circular buffer 221 replacing a least recent image of the plurality of images in the circular buffer 221.

In this illustrative embodiment, the block diagram schematic 200 also includes a communication circuit 206 that can be configured for wired or wireless communication with one or more other devices or networks. The networks can include a wide area network, a local area network, and/or personal area network. The communication circuit 206 may also utilize wireless technology for communication, such as, but are not limited to, peer-to-peer or ad hoc communications such as HomeRF, Bluetooth and IEEE 802.11; and other forms of wireless communication such as infrared technology. The communication circuit 206 can include wireless communication circuitry, one of a receiver, a transmitter, or transceiver, and one or more antennas.

In one embodiment, the one or more processors 110 can be responsible for performing the primary functions of the electronic device with which the block diagram schematic 200 is operational. For example, in one embodiment the one or more processors 110 comprise one or more circuits operable with the user interface 202 to present presentation information to a user. The executable software code used by the one or more processors 110 can be configured as one or more modules 207 that are operable with the one or more processors 110. Such modules 207 can store instructions, control algorithms, and so forth.

In one or more embodiments, the block diagram schematic 200 includes an audio input/processor 209. The audio input/processor 209 can include hardware, executable code, and speech monitor executable code in one embodiment. The audio input/processor 209 can include, stored in memory 205, basic speech models, trained speech models, or other modules that are used by the audio input/processor 209 to receive and identify voice commands that are received with audio input captured by an audio capture device. In one embodiment, the audio input/processor 209 can include a voice recognition engine. Regardless of the specific implementation utilized in the various embodiments, the audio input/processor 209 can access various speech models to identify speech commands in one or more embodiments.

Various sensors can be operable with the one or more processors 110. FIG. 2 illustrates several examples such sensors. It should be noted that those shown in FIG. 2 are not comprehensive, as others will be obvious to those of ordinary skill in the art having the benefit of this disclosure. Additionally, it should be noted that the various sensors shown in FIG. 2 could be used alone or in combination. Accordingly, many electronic devices will employ only subsets of the sensors shown in FIG. 2, with the particular subset defined by device application.

A first example of a sensor that can be included with the other components 208 is a touch sensor. The touch sensor can include a capacitive touch sensor, an infrared touch sensor, resistive touch sensors, or another touch-sensitive technology.

Another example of a sensor is a geo-locator that serves as a location detector 210. In one embodiment, location detector 210 is able to determine location data when the touchless authentication process occurs by capturing the location data from a constellation of one or more earth orbiting satellites, or from a network of terrestrial base stations to determine an approximate location. The location detector 210 may also be able to determine location by locating or triangulating terrestrial base stations of a traditional cellular network, or from other local area networks, such as Wi-Fi networks.

One or more motion detectors can be configured as an orientation detector 211 that determines an orientation and/or movement of the electronic device 100 in three-dimensional space. Illustrating by example, the orientation detector 211 can include an accelerometer, gyroscopes, or other device to detect device orientation and/or motion of the electronic device 100. Using an accelerometer as an example, an accelerometer can be included to detect motion of the electronic device 100. Additionally, the accelerometer can be used to sense some of the gestures of the user, such as one talking with their hands, running, or walking.

The orientation detector 211 can determine the spatial orientation of an electronic device 100 in three-dimensional space by, for example, detecting a gravitational direction. In addition to, or instead of, an accelerometer, an electronic compass can be included to detect the spatial orientation of the electronic device relative to the earth's magnetic field. Similarly, one or more gyroscopes can be included to detect rotational orientation of the electronic device 100.

A gaze detector 212 can comprise sensors for detecting the user's gaze point. The gaze detector 212 can optionally include sensors for detecting the alignment of a user's head in three-dimensional space. Electronic signals can then be processed for computing the direction of user's gaze in three-dimensional space. The gaze detector 212 can further be configured to detect a gaze cone corresponding to the detected gaze direction, which is a field of view within which the user may easily see without diverting their eyes or head from the detected gaze direction. The gaze detector 212 can be configured to alternately estimate gaze direction by inputting images representing a photograph of a selected area near or around the eyes. It will be clear to those of ordinary skill in the art having the benefit of this disclosure that these techniques are explanatory only, as other modes of detecting gaze direction can be substituted in the gaze detector 212 of FIG. 2.

Other components 208 operable with the one or more processors 110 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 208 can also include proximity sensors. The proximity sensors fall in to one of two camps: active proximity sensors and "passive" proximity sensors. Either the proximity detector components or the proximity sensor components can be generally used for gesture control and other user interface protocols, some examples of which will be described in more detail below.

As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable electronic device worn by user, serves as the transmitter. Illustrating by example, in one the proximity sensor components comprise a signal receiver to receive signals from objects external to the housing 201 of the electronic device 100. In one embodiment, the signal receiver is an infrared signal receiver to receive an infrared emission from an object such as a human being when the human is proximately located with the electronic device 100.

Proximity sensor components are sometimes referred to as a "passive IR detectors" due to the fact that the person is the active transmitter. Accordingly, the proximity sensor component requires no transmitter since objects disposed external to the housing deliver emissions that are received by the infrared receiver. As no transmitter is required, each proximity sensor component can operate at a very low power level. Simulations show that a group of infrared signal receivers can operate with a total current drain of just a few microamps.

By contrast, proximity detector components include a signal emitter and a corresponding signal receiver. While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers.

In one or more embodiments, each proximity detector component can be an infrared proximity sensor set that uses a signal emitter that transmits a beam of infrared light that reflects from a nearby object and is received by a corresponding signal receiver. Proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

The other components 208 can optionally include a barometer operable to sense changes in air pressure due to elevation changes or differing pressures of the electronic device 100. The other components 208 can also optionally include a light sensor that detects changes in optical intensity, color, light, or shadow in the environment of an electronic device. Similarly, a temperature sensor can be configured to monitor temperature about an electronic device.

A context engine 213 can then operable with the various sensors to detect, infer, capture, and otherwise determine persons and actions that are occurring in an environment about the electronic device 100. For example, where included one embodiment of the context engine 213 determines assessed contexts and frameworks using adjustable algorithms of context assessment employing information, data, and events. These assessments may be learned through repetitive data analysis. Alternatively, a user may employ the user interface 202 to enter various parameters, constructs, rules, and/or paradigms that instruct or otherwise guide the context engine 213 in detecting multi-modal social cues, emotional states, moods, and other contextual information. The context engine 213 can comprise an artificial neural network or other similar technology in one or more embodiments.

In one or more embodiments, the context engine 213 is operable with the one or more processors 110. In some embodiments, the one or more processors 110 can control the context engine 213. In other embodiments, the context engine 213 can operate independently, delivering information gleaned from detecting multi-modal social cues, emotional states, moods, and other contextual information to the one or more processors 110. The context engine 213 can receive data from the various sensors. In one or more embodiments, the one or more processors 110 are configured to perform the operations of the context engine 213.

An authentication system 111 can be operable with an imager 102. In one embodiment, the imager 102 comprises a two-dimensional imager configured to receive at least one image of a person within an environment of the electronic device 100. In one embodiment, the imager 102 comprises a two-dimensional RGB imager. In another embodiment, the imager 102 comprises an infrared imager. Other types of imagers suitable for use as the imager 102 of the authentication system 111 will be obvious to those of ordinary skill in the art having the benefit of this disclosure.

The authentication system 111 can be operable with a face analyzer 219 and an environmental analyzer 214. The face analyzer 219 and/or environmental analyzer 214 can be configured to process an image of an object and determine whether the object matches predetermined criteria. For example, the face analyzer 219 and/or environmental analyzer 214 can operate as an identification module configured with optical and/or spatial recognition to identify objects using image recognition, character recognition, visual recognition, facial recognition, color recognition, shape recognition, and the like. Advantageously, the face analyzer 219 and/or environmental analyzer 214, operating in tandem with the authentication system 111, can be used as a facial recognition device to determine the identity of one or more persons detected about the electronic device 100.

Illustrating by example, in one embodiment when the authentication system 111 detects a person, the imager 102 can capture a photograph of that person. The authentication system 111 can then perform an image analysis operation on the captured image. This can be done in a variety of ways. In a simple embodiment, the authentication system 111 can compare the image to one or more predefined authentication reference images stored in the memory 205. This comparison, in one or more embodiments, is used to confirm beyond a threshold authenticity probability that the person's face in the image sufficiently matches one or more of the reference files. In another embodiment, the authentication system 111 can compare the image—or one or more parameters extracted from the image or captured by the imager 102—to parameters of a neural network. Accordingly, in one or more embodiments the authentication system 111 can compare data received by the imager 102 to one or more predefined reference images and/or predefined authentication references and/or mathematical models to determine beyond a threshold authenticity probability that the person's face is the face of an authorized user of the electronic device 100.

Beneficially, this optical recognition performed by the authentication system 111 operating in conjunction with the face analyzer 219 and/or environmental analyzer 214 allows access to the electronic device 100 only when one of the persons detected about the electronic device are sufficiently identified as the owner or an authorized user of the electronic device 100. Accordingly, in one or more embodiments the one or more processors 110, working with the authentication system 111 and the face analyzer 219 and/or environmental analyzer 214, can determine whether at least one image captured by the imager 102 matches one or more predefined criteria. In one or more embodiments, where they do, the one or more processors 110 grant limited operational access to features, applications, or data of the electronic device 100.

As noted above, the one or more processors 110, operating in conjunction with the authentication system 111, can also determine whether there is a depiction of at least one predefined mien in images captured by the imager 102. In one or more embodiments, this occurs while the limited operational access is granted. The one or more processors 110, operating with the authentication system 111, can then compare depictions of any identified miens, which may be identified by detecting changes between images in a plurality of images stored within the circular buffer 221 in one or more embodiments, to one or more authentication references stored in the memory 205 of the electronic device 100. Where there is a depiction of at least one predefined mien in an image, the one or more processors 110 can grant additional operational access to the features, applications, or data of the electronic device 100.

Illustrating by example, in one or more embodiments the face analyzer 219 and/or environmental analyzer 214 is configured to identify an expressed mien from at least one image. In one or more embodiments, the one or more processors 110 grant additional operational access to the features, applications, or data of the electronic device 100 when the expressed mien matches a fourth predefined criterion.

As noted above, examples of expressed miens include one of one or more raised eyebrows, one or more closed eyes, one or more fingers touching a face, an opened mouth, looking up, looking down, looking to the right, looking to the left, or being situated adjacent to a predefined object. As such, in one or more embodiments the one or more processors 110 grant additional operational access to the features, applications, or data of the electronic device 100 where the predefined mien is detected within an image captured by the imager 102.

In one or more embodiments, a user can "train" the electronic device 100 by storing predefined miens 295 in the face analyzer 219 or reference photos 216 depicting the predefined miens in the memory 205 of the electronic device 100. Illustrating by example, a user may take a series of pictures. These can include specifically articulated miens. They can include the user raisin a hand or looking in one direction, such as in a profile view. The miens can include raised eyebrows or one eye closed or an open mouth or a finger touching the chin. These are merely examples of items that can be stored in the reference images. Others will be readily obvious to those of ordinary skill in the art having the benefit of this disclosure. Any of these can constitute the fourth criterion from the preceding paragraph.

It is contemplated that in some situations, facial recognition or mien detection can fail. In one or more embodiments, when this occurs, the one or more processors 110 prompt, on the user interface 202, for one or more of a personal identification number or password.

Authentication, using facial recognition, and advanced feature, data, or application access, using mien detection, can occur in series, with more and more operational access to the features being granted as the required number of miens are expressed. Thus, in one or more embodiments the authentication system 111 or one or more processors 110 are able to detect the mien while the limited operational access is granted. Thereafter, the one or more processors 110 can grant full operational access to the features, applications, or data of the electronic device 100 when the necessary mien or miens is/are expressed.

Figure 3:
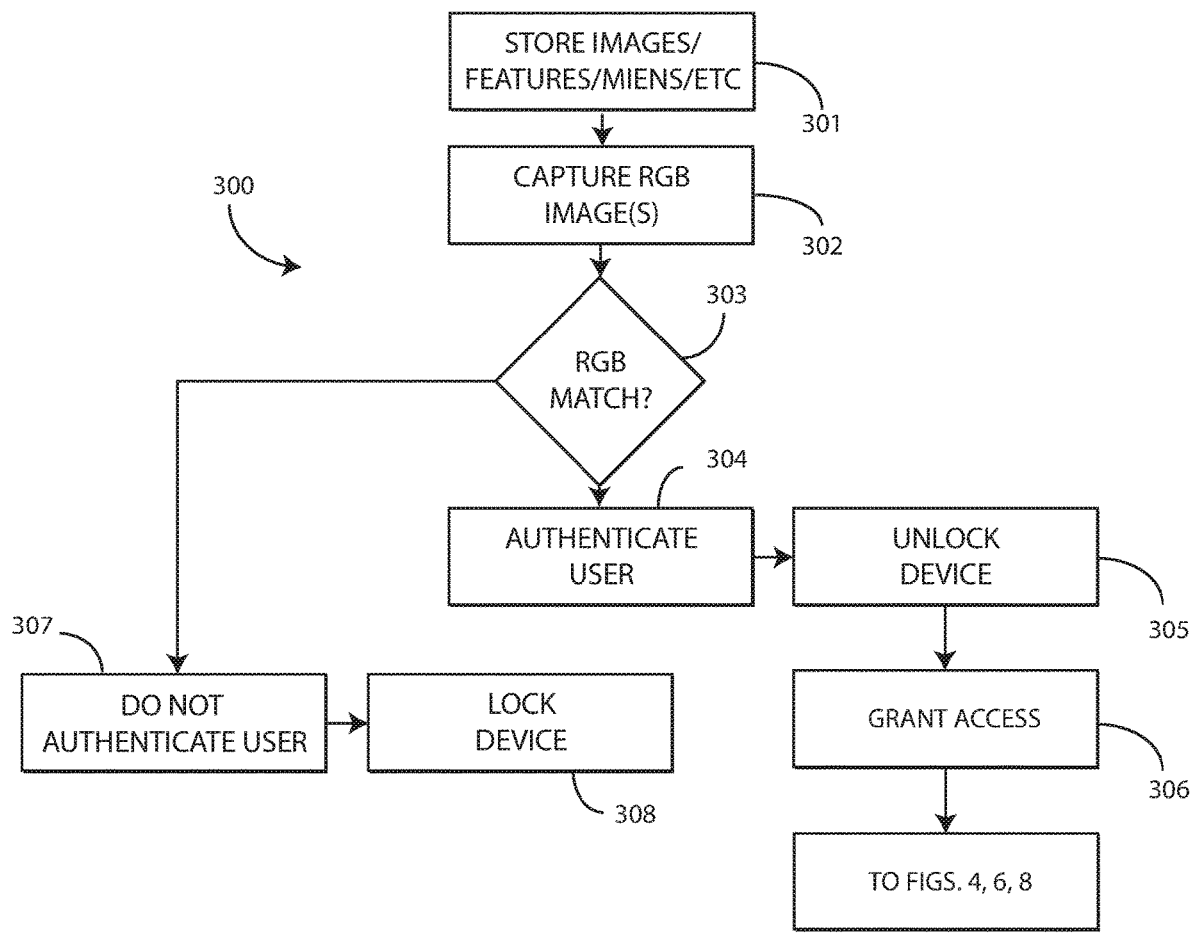
FIG. 3 illustrates one explanatory method in accordance with one or more embodiments of the disclosure.

Turning now to FIG. 3, illustrated therein is one explanatory method 300 in accordance with one or more embodiments of the disclosure. The method 300 of FIG. 3 comprises the facial recognition portion of various methods configured in accordance with embodiments of the disclosure, and can be used in tandem with other mien detection portions described below. Examples of the combined use of the facial recognition and mien detection portions of the various methods described herein will be illustrated in FIGS. 5 and 7.

Beginning at optional step 301, the method 300 optionally includes storing, as one or more predefined reference images in a memory of an electronic device, predefined facial features of an authorized user of the electronic device. These predefined facial features include a predefined mien in one or more embodiments, as noted above. The predefined facial features may be stored by capturing one or more training images, one or more training facial scans, or combinations thereof.

At step 302, the method 300 includes capturing, with an imager, at least one image of an object such as a person who is within a vicinity of the electronic device. At decision 303, the method 300 compares the at least one image captured at step 302 with the one or more predefined reference images.

At step 304, where the at least one image sufficiently corresponds to the one or more predefined reference images, the method 300 authenticates the person as an authorized user of the electronic device. In one or more embodiments, step 305 then unlocks the device, thereby providing the authorized user with access to the operating system of the electronic device. Step 306 then grants limited operational access to features, applications, or data of the electronic device.

For example, in one or more embodiments the limited access granted at step 306 provides granting access to the electronic device when the electronic device is operating in a privacy mode of operation. Illustrating by example, step 306 may reveal user actuation targets along the display representing various applications, files, folders, and data repositories operating on the electronic device. For those applications not using, revealing, or processing personal or private data belonging to the authorized user of the electronic device, such applications can be used with the access granted at step 306 when the electronic device is operating in the privacy mode of operation. A calculator application may be freely accessible, as is a phone application having no embedded contact or address list information associated therewith. By contrast, the access granted at step 306 may bot allow access to financial or health applications due to the fact that they use and/or may reveal private or personal data belonging to the authorized user of the electronic device. Similarly, notifications generated by applications operating on the one or more processors of the electronic device may be accessible while interactive application portals allowing access to the applications themselves may be inaccessible with the facial recognition only access granted at step 306.

Otherwise, the operational access to the features, applications, and data of the electronic device is denied at step 307. Where this is the case, the electronic device can optionally be locked at step 308.

Where the person is authorized as the authorized user of the electronic device, additional operations can be performed to grant additional operational access to the features, applications, and data of the electronic device. In one or more embodiments, these additional operations comprise detection of a mien. These operations can occur simultaneously with the method 300 of FIG. 3, or after the method 300 of FIG. 3. Examples of such additional operations are described below with reference to FIGS. 4, 6, and 8.

Figure 4:
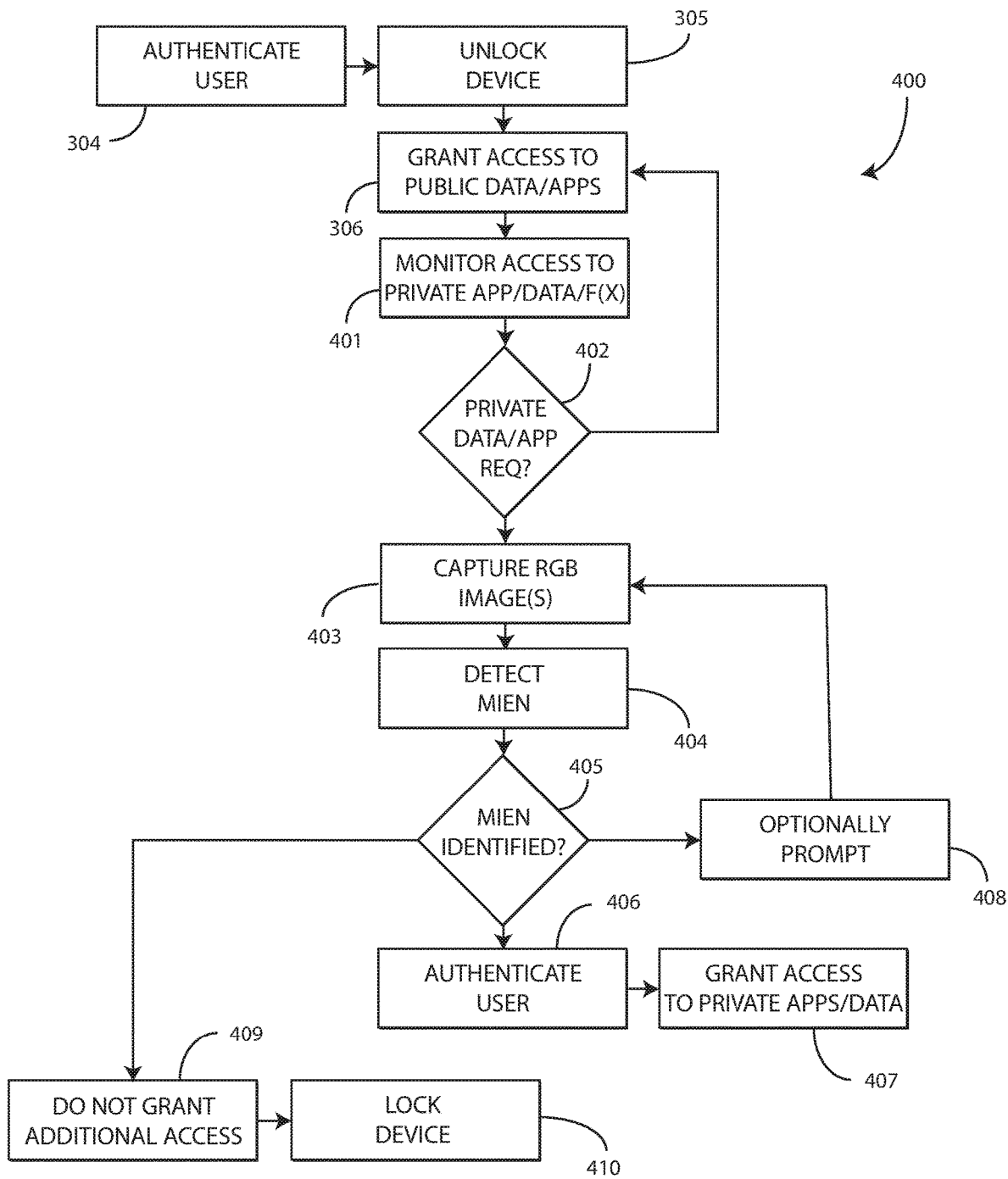
FIG. 4 illustrates another explanatory method in accordance with one or more embodiments of the disclosure.

Beginning with FIG. 4, after the facial recognition authentication performed by the method (300) of FIG. 3 authenticates a person as the authorized user of the electronic device at step 304, unlocks the electronic device and grants the authorized user access to the operating system at step 305, and grants limited operational access to the features, applications, or data of the electronic device at step 306, the method 400 moves to step 401. At step 401, the method 400 monitors for user input requesting access to an application, feature, or data of the electronic device that uses, accesses, processes, or can reveal personal data, such as financial data, health data, contact lists, sent correspondence, received correspondence, and so forth.

Decision 402 then determines whether such user input is received. For example, if user input is received requesting access to a financial application showing bank or brokerage account balances belonging to the authorized user, this request is detected at decision 402. While the mien detection process of FIG. 4 can occur simultaneously with the facial recognition process of FIG. 3 in some embodiments, in other embodiments the request for access to applications, features, or data that includes personal or private data belonging to the user, detected at decision 402, is used as a trigger for the mien detection process of FIG. 4.

Specifically, in response to detecting user input requesting access to an application, feature, or data of the electronic device that uses, accesses, processes, or can reveal personal data at decision 402, in one or more embodiments step 403 comprises an imager capturing at least one image of an object situated within an environment of the electronic device. Step 404 then comprises determining, by comparing the at least one image to one or more predefined reference images, whether the at least one image comprises a depiction of a mien expressed by the object. Decision 405 then determines whether the mien expressed by the object is a predefined mien that is identifiable as being associated with a predefined function, operation, application, or authorized user of the electronic device. Where it is, step 406 authenticates the expressed mien as being one associated with predefined function, operation, application, or authorized user of the electronic device. Step 407 then grants additional access to the electronic device.

Thus, in one or more embodiments step 304 comprises, when an object depicted in the at least one image captured at step (302) of FIG. 3 sufficiently corresponds to the one or more predefined reference images, authenticating the object as an authorized user of the electronic device. When the object is authenticated as the authorized user of the electronic device at step 304 and the at least one image comprises the depiction of the mien expressed by the object as determined by decision 405, step 406 and step 407 grants full operational access to the features, the applications, or the data of the electronic device. By contrast, when the object is authenticated as the authorized user of the electronic device at step 304 and the at least one image fails to comprise the depiction of the mien expressed by the object as determined by decision 405, the method 400 returns to step 306 where only the limited operational access is granted to features, applications, or data of the electronic device.

Otherwise, in one or more embodiments the operational access to the features, applications, and data of the electronic device is denied at step 409. Where this is the case, the electronic device can optionally be locked at step 410. However, in other embodiments, the step 410 of locking the electronic device can be associated with a predefined mien. For example, if an authorized user of an electronic device wants to intentionally lock the electronic device, such as to prevent an eavesdropper from seeing private information, in one or more embodiments they may express a predefined mien that is captured at step 403 and detected at step 404, but that is associated with locking the electronic device. Accordingly, in one or more embodiments decision 405 can intentionally cause step 409 and step 410 to occur when a predefined mien is detected at step 404 and that predefined mien corresponds to a control operation causing the electronic device to be locked.

Thus, the method 400 of FIG. 4 provides a mien detection procedure that can be employed to grant additional operational access to features, applications, or data of the electronic device. In one or more embodiments where a mien is detected at step 404 and identified by decision 405, the grant of additional operational access to features, applications, data, or other functionality of the electronic device occurs only when the mien sufficiently corresponds to a predefined mien stored in a memory of the electronic device.

In one or more embodiments, the additional access granted at step 407 is embedded within one or more specific applications. Accordingly, while step 306 grants access outside of an application, step 407 can grant access within an application. Illustrating by example, after being granted access to the operating system at step 305, and to applications, features, or data not involving personal data belonging to an authorized user of the electronic device at step 306, in one or more embodiments when a user launches a "high security" application, such as a financial or medical application, which is detected at decision 402, the remainder of the method 400 of FIG. 4 can be performed by a predefined application. Thus, the financial application can cause the imager to capture images at step 403, can detect a mien expression at step 404, can determine whether the mien is identified at decision 405, and can grant access to the financial application at step 407.

In one or more embodiments, if the mien fails to be identified at decision, the method 400 can optionally actuate a high confidence authenticator at step 408. Illustrating by example, step 408 can comprise the method 400 actuating an iris scanner or PIN code entry application to verify with a high degree of confidence that the user is indeed the authorized user of the electronic device. The retinal scan or PIN code can then be compared to a predefined authentication reference, as was the case with the mien. If there is a match, full operational access to the electronic device can be granted at step 407. If there is no match, the additional operational access to the features, applications, and data of the electronic device is denied and the method 400 returns to step 306.

As previously described, the method 400 of FIG. 4 can be repeated iteratively, with additional miens being detected at step 403 to grant additional levels of access to the features, applications, or data of the electronic device. This allows the method 400 to slowly grant access to more private data only when the person requesting the same is capable of expressing a plurality of miens to gain that access. As the expression of more miens continues to sufficiently match predefined authentication references, increasing operational access can be granted to the features, applications, or data of the electronic device.

In one or more embodiments, the number of additional miens required to match predefined authentication references to grant access to various applications, features, or data can be user definable using a settings application of the electronic device. Thus, some users can grant full access to the features, applications, or data of the electronic device when only two miens are expressed that sufficiently match predefined authentication references, while other users can require someone to express larger number of miens sufficiently matching the predefined authentication factors prior to granting the highest level of access to, for example, sensitive personal data.

Figure 5:
FIG. 5 illustrates still another explanatory method in accordance with one or more embodiments of the disclosure.

Turning now to FIG. 5, illustrated therein is another explanatory method 500 in accordance with embodiments of the disclosure. Beginning at step 501, a user 508 is holding an electronic device 510. In this illustrative embodiment, the electronic device 510 comprises a first device housing 511 separated by a hinge 513 from a second device housing 512, which is shown at step 502. In one or more embodiments, the first device housing 511 is pivotable about the hinge 513 relative to the second device housing 512 from a closed position, shown at steps 501,502, to an axially displaced open position, which is shown at steps 504-507.

At step 501, the user 508 holding the electronic device 510 while the electronic device 510 is in the closed position. An exterior display 514 is disposed on the exterior side of the first device housing 511 is exposed and visible. An interior display 515, shown at step 504, is concealed when the electronic device 510 is in the closed position due to the fact that the interior surfaces of the first device housing 511 and the second device housing 512, along which interior display 515 is disposed, abut when the electronic device 510 is in the closed position.

At step 501, one or more processors of the electronic device 510 present one or more user actuation targets 509 on the exterior display 514. In this illustration, the one or more user actuation targets 509 are each associated with a corresponding predefined application operating on the one or more processors of the electronic device 510. In this illustration, the one or more user actuation targets 509 comprise two or more user actuation targets (here four) associated with two or more predefined applications (again, here four). The number of user actuation targets and corresponding applications can be one, two, three, four, or more in various embodiments.

The user actuation targets 509 are "targets" because they represent visual objects that, when placed upon a touch-sensitive display such as exterior display 514, can be actuated when the user 508 interacts with the user actuation targets 509 by touching, moving, sliding, expanding, or otherwise interacting with them with a finger, stylus, or other object placed atop the user actuation targets 509 along the exterior display 514.

In one or more embodiments, these user actuation targets 509, which can be configured graphically as images, words, shapes, or other objects, indicate that one or more notifications have been received in one or more embodiments. For example, in one embodiment the electronic device 510 has (as did electronic device 100 of FIG. 2) an Internet browser application, an electronic mail application, a photos application, and a social media application. In one or more embodiments, the user 508 can employ a control panel within these applications, or alternatively globally within the electronic device 510, to allow the applications to receive one or more notifications.

Illustrating by example, when new electronic mail correspondence is received, the electronic mail application may cause a user actuation target 509 shaped like an envelope to appear on the exterior display 514. Similarly, when a friend posts new content, the social media application may cause a user actuation target 509 that is shaped like a picture to be presented on the exterior display 514, and so forth. These examples are illustrative only, as numerous other user actuation targets and corresponding applications will be obvious to those of ordinary skill in the art having the benefit of this disclosure.

At shown at step 501, the user 508 is interacting with one of the user actuation targets 509 with a finger. The user interaction with the user actuation target 509 can take various forms. In one embodiment, the user interaction with the user actuation target 509 comprises the user 508 touching the exterior display 514 at the user actuation target 509 with the finger. In another embodiment, the user interaction with the user actuation target 509 comprises the user 508 touching and holding the finger on the exterior display at the user actuation target 509 for a predefined amount of time. In another embodiment, the user interaction with the user actuation target 509 comprises the user 508 touching the exterior display 514 with the finger at the user actuation target 509 and making a gesture such as a swiping motion. These examples of user interaction with the user actuation target 509 are illustrative only, as numerous others will be obvious to those of ordinary skill in the art having the benefit of this disclosure.

In one or more embodiments, different user interactions with the user actuation target 509 can cause different operations to occur. For example, in one embodiment a first user interaction with the user actuation target 509 causes a first control operation to occur, while a second user interaction with the user actuation target 509 causes a second control operation to occur, and so forth. Using a notification as an illustrative example, in one embodiment presentation of the user actuation target 509 on the exterior display 514 indicates that a notification has been received from a corresponding application, or alternatively has been generated by the corresponding application. In one or more embodiments, the shape or visual appearance of the user actuation target 509 identifies the corresponding application from which the notification was received.

In one or more embodiments, a first user interaction with the user actuation target 509 causes a first control operation to occur. For example, the user 508 can touch the exterior display 514 with the finger and hold the finger there for a predetermined amount of time to cause an authentication process to occur.

For example, at step 502 an imager of the electronic device 510 captures at least one image of the user 508. In this example, the imager of the electronic device 510 captures a plurality of images 516,517 of the user 508. Thereafter, one or more processors of the electronic device 510 compare, at step 502, at least one image of the plurality of images 516,517 with one or more predefined reference images. The one or more processors can optionally also determine, at step 502, whether there is movement between at least two images of the plurality of images 516,517 as previously described.

In one or more embodiments, at step 502 the one or more processors perform a facial recognition process by determining, by comparing the at least one image of the plurality of images with the one or more predefined reference images, whether the at least one image sufficiently corresponds to the one or more predefined reference images. In this illustrative example it does, so the one or more processors grant limited operational access to features, applications, and/or data of the electronic device 510 at step 503.

In this illustrative example, the limited operational access granted at step 503 allows access to one or more notifications generated by one or more predefined applications operating on the one or more processors of the electronic device 510, and precludes access to interactive application portals of the one or more predefined applications operating on the one or more processors. Accordingly, as shown at step 503, the one or more processors allow the user 508 to "peek" at the notification 518 to see the notification's content. Said differently, the successful facial recognition process occurring at step 502 has granted access to the notification 518. Accordingly, step 503 causes the notification 518 to expand, thereby revealing additional notification information.

In one or more embodiments, the notification 518 will include content. In one embodiment, the content will comprise the additional notification information that becomes viewable when the notification 518 represented by the user actuation target 509 expands. The content could be text content, picture content, multimedia content, or other content. Frequently, to conserve processing power and to make the presentation of the notification 518 more efficient, the content will only be text content. However, embodiments of the disclosure are not so limited, and the notification 518 could include other types of content as well.

In one or more embodiments, the notification 518 will also include at least one interactive element. In this illustration, the notification 518 comprises a first interactive element and a second interactive element. The interactive elements are objects with which the user 508 may interact to perform control operations.

In this illustration, the notification 518 indicates that an electronic message has been received by the application associated with the notification, which is the electronic mail application. The content indicates that the message was received from the user's best friend, Buster, and includes an invitation for the user 508 and Buster to share a meal together.

In this example, the facial recognition occurring at step 502 grants limited operational access allowing access to one or more notifications generated by one or more predefined applications operating on the one or more processors of the electronic device 510, but precludes access to interactive application portals of the one or more predefined applications operating on the one or more processors. Accordingly, for the user 508 to be able to interact with the application presenting the notification 518, in one or more embodiments a mien detection process is first required.

In one or more embodiments, performance of the mien detection process is triggered by the first device housing 511 pivoting relative to the second device housing 512 about the hinge 513 from the closed position to the axially displaced open position. Said differently, in one or more embodiments the determination whether at least one image captured by the imager of the electronic device 510 comprises a depiction of a mien expressed by the user 508 is triggered by the first device housing 511 pivoting about the hinge 513 relative to the second device housing 512 from the closed position to the axially displaced open position.

At step 504, the user 508 has pivoted the first device housing 511 about the hinge 513 relative to the second device housing 512 to the axially displaced open position. The interactive application portals 519 of the applications operating on the one or more processors of the electronic device 510 and corresponding to the notifications 518 are then presented on the interior display 514.

At step 505, the user 508 interacts with one of the interactive application portals 519. Since this is an interactive application portal 519 of a financial application, it processes and reveals private, personal data. Accordingly, prior to access being granted to this financial application, a mien detection process is required.

As shown at step 506, the imager of the electronic device 510 captures one or more images 520,521 of the user 508, who is expressing a mien 522 in the form of an open, smiling mouth. In one or more embodiments, the one or more processors of the electronic device 510 determine, at step 506 by comparing the one or more images 520,521 with one or more predefined reference images or predefined authentication references, whether the one or more images 520,521 comprise a depiction of a predefined mien associated with the financial application.

If the one or more images 520,521 had failed to comprise the depiction of the mien expressed by the object (as would have been the case with the at least one image 516,517 of Step 502), the one or more processors would grant only limited operational access to features, applications, or data of the electronic device 510. Accordingly, the user 508 would have been precluded from using the interactive application portal 519 of the financial application. However, in this example the user 508 has been authenticated as the authorized user of the electronic device 510 at step 502 the one or more images 520,521 comprise the depiction of the mien 522 expressed by the user 508. Accordingly, at step 507 the one or more processors of the electronic device 510 grant full operational access to the features, the applications, or the data of the electronic device 510.

As shown, the user 508 can now see the personal information 523 revealed by the interactive application portal 519 of the financial application due to the fact that the full operational access granted allows access to the interactive application portals 519 of the one or more predefined applications operating on the one or more processors. In one or more embodiments, the granting of full operational access to the features, the applications, or the data of the electronic device 510 occurring only when the first device housing 511 is pivoted about the hinge 513 relative to the second device housing 512 to the axially displaced open position of step 507.

In other embodiments, the mien detection process can be performed when the first device housing 511 is pivoted about the hinge 513 relative to the second device housing 512 to the closed position. For example, in another embodiment, the facial recognition process of step 502 and the mien detection process of step 506 could both be performed at step 502 when the electronic device 510 is in the closed position, thereby allowing the user 508 to interact with the user actuation targets presented on the notification 518 of step 503. For example, where this is the case, after expressing the necessary mien 522 the user 508 might navigate between notifications 518 by interacting with them. The user 508 makes a swipe gesture to move one notification 518 off the exterior display 514 so that another can be presented.

In other embodiments, where the facial recognition process and mien detection process are concurrently performed at step 502, the user 508 may take immediate action upon the notification 518 by interacting with the interactive elements. In this example, as shown at step 503, the first interactive element comprises a user actuation target that is the word "reply." This is an action interactive element, as interacting with it causes an action to occur in response to the receipt of the notification 518. In this illustration, interacting with the first interactive element might cause a preformatted reply message or other message to be sent back to Buster. An example of a preformatted reply message might be "that sounds absolutely wonderful." Other examples of preformatted reply messages will be obvious to those of ordinary skill in the art having the benefit of this disclosure. Moreover, other response actions that can occur in response to user interaction with the first interactive element will be obvious to those of ordinary skill in the art as well.

In this example, the second interactive element is another user actuation target configured as the words "mark read." This is a dismissal interactive element, as interacting with it causes the notification 518 to be dismissed so as not to appear on the exterior display 514 again. Accordingly, when the user 508 wishes not to take action in response to receiving the notification 518, but instead wants to dismiss the notification 518 without taking action, the user 508 can simply interact with the second interactive element by touching it.

Figure 6:
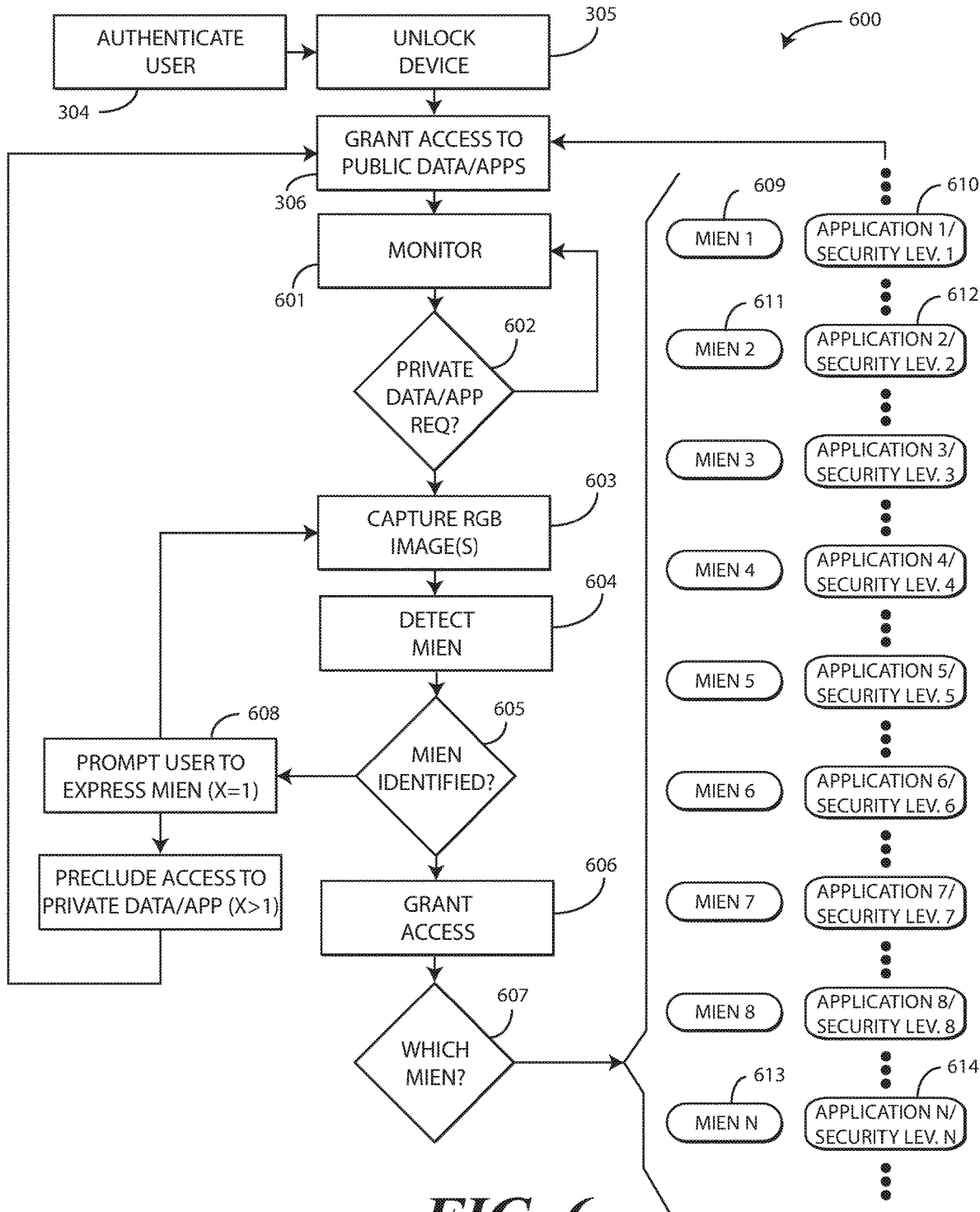
FIG. 6 illustrates still another method in accordance with one or more embodiments of the disclosure.

Turning now to FIG. 6, illustrated therein is yet another method 600 in accordance with embodiments of the disclosure. Rather than expressing a mien to gain access to an interactive application portal or feature or data of an electronic device, as was the case in FIG. 5, in the method 600 of FIG. 6, a user can associate different miens with different applications. Accordingly, each application can require a different mien for added security. In some embodiments, the user can select between applications simply by expressing a predefined mien. As with the method (400) of FIG. 4, the method 600 of FIG. 6 can follow, or be executed concurrently with, the facial recognition operations performed in the method (300) of FIG. 3.

In one or more embodiments, after the facial recognition authentication performed by the method (300) of FIG. 3 authenticates a person as the authorized user of the electronic device at step 304, unlocks the electronic device and grants the authorized user access to the operating system at step 305, and grants limited operational access to the features, applications, or data of the electronic device at step 306, the method 600 moves to step 601. At step 601, the method 600 monitors for user input requesting access to an application, feature, or data of the electronic device that uses, accesses, processes, or can reveal personal data, such as financial data, health data, contact lists, sent correspondence, received correspondence, and so forth.

Decision 602 then determines whether such user input is received. For example, if user input is received requesting access to a social media application showing personal posts by, or revealing personal contacts of, the authorized user, this request is detected at decision 602. While the mien detection process of FIG. 6 can occur simultaneously with the facial recognition process of FIG. 3 in some embodiments, in other embodiments the request for access to applications, features, or data that includes personal or private data belonging to the user, detected at decision 602, is used as a trigger for the mien detection process as was the case with FIG. 4 above.

In one or more embodiments, in response to detecting user input requesting access to an application, feature, or data of the electronic device that uses, accesses, processes, or can reveal personal data at decision 602, step 603 comprises an imager capturing a plurality of images of an object situated within an environment of the electronic device. Step 604 then comprises determining, by comparing the plurality of images to one or more predefined reference images, whether at least one image of the plurality of images comprises a depiction of a mien expressed by the object.

Decision 604 then determines whether the mien expressed by the object is a predefined mien that is identifiable as being associated with a predefined function, operation, application, or authorized user of the electronic device. Where it is, step 606 authenticates the expressed mien as being one associated with predefined function, operation, application, group of applications, or authorized user of the electronic device and grants additional access to the electronic device. Thus, in one or more embodiments decision 605 and step 606 perform a mien detection operation on one or more images of the plurality of images captured at step 603 to determine whether the one or more images comprise a depiction of one or more predefined miens expressed by a user. Decision 607 then determines which mien was expressed in the one or more images, with each predefined mien corresponding to its own application. Accordingly, when the at least one image captured at step (302) of FIG. 3 sufficiently corresponds to the one or more predefined reference images, as determined by decision (303) of FIG. 3, and the one or more images captured at step 603 fail to comprise the depiction of the one or more predefined miens expressed by the user, as determined by step 604 and decision 605, the method returns to step 306 where limited operational access to features, applications, or data of the electronic device is granted. The method 600 can optionally prompt the user to express a mien at step 608.

However, when the at least one image captured at step (302) of FIG. 3 sufficiently corresponds to the one or more predefined reference images, as determined by decision (303) of FIG. 3, and the one or more images captured at step 603 comprise the depiction of a first predefined mien 609 expressed by the object, step 606 grants, in one or more embodiments, a first additional operational access to the features, the applications, or the data of the electronic device. In one illustrative embodiment, the first additional operational access 610 to the features, the applications, or the data of the electronic device comprises access to a first application operating on one or more processors of the electronic device.

In another embodiment, this first additional operational access 610 corresponds to a predefined security level of the electronic device to which the authorized user can assign various applications. Accordingly, by being granted the first additional operational access 610 to the first predefined security level, the authorized user would be granted access to this suite of applications in one or more embodiments. Recall from above that the first additional operational access 610 can be granted on the application level as well. Accordingly, in another embodiment the first additional operational access 610 to the features, the applications, or the data of the electronic device comprises access to a first suite of features operating on one or more applications of the electronic device. Other examples of the first additional operational access 610 will be obvious to those of ordinary skill in the art having the benefit of this disclosure.

Similarly, when the at least one image captured at step (302) of FIG. 3 sufficiently corresponds to the one or more predefined reference images, as determined by decision (303) of FIG. 3, and the one or more images captured at step 603 comprise the depiction of a second predefined mien 611 expressed by the object, step 606 grants a second additional operational access 612 to the features, the applications, or the data of the electronic device. In one illustrative embodiment, the second additional operational access 612 to the features, the applications, or the data of the electronic device comprises access to a second application operating on one or more processors of the electronic device. Accordingly, the first additional operational access and the second additional operational access allow access to different features, applications, or data of the electronic device in this example.

In another embodiment, this second additional operational access 612 corresponds to a second predefined security level of the electronic device. The authorized user of the electronic device can optionally assign various applications to this higher level of security. Accordingly, by being granted the second additional operational access 612 to the second predefined security level, the authorized user may be granted access to another suite of applications that were inaccessible at the first predefined security level. As before, the second additional operational access 612 can be granted on the application level as well, thereby granting operational access to a second suite of features operating on one or more applications of the electronic device. Other examples of the second additional operational access 612 will be obvious to those of ordinary skill in the art having the benefit of this disclosure.

The method 600 of FIG. 6 can repeat until the final mien is expressed, thereby granting full access to the features, applications, or data of the electronic device. For example, in FIG. 6 nine different applications are shown with nine different miens. If the process repeated through all nine cycles, full access would be granted to the features, applications, or data of the electronic device. Said differently, when the at least one image captured at step (302) of FIG. 3 sufficiently corresponds to the one or more predefined reference images, as determined by decision (303) of FIG. 3, and the one or more images captured at step 603 comprise the depiction of a ninth predefined mien 613 expressed by the object, step 606 would comprise granting full operational access to the features, the applications, or the data of the electronic device since no more miens were available. While nine predefined miens and corresponding security levels, application or feature suites, or applications are shown in FIG. 6 for completeness, it is to be understood that other embodiments may have more, or fewer, predefined miens and corresponding security levels, application or feature suites, or applications. For example, another electronic device may have only three levels—a privacy mode of operation, a semi-private mode of operation, and a normal mode of operation—that correspond, respectfully to only two predefined miens and a simple facial recognition. Other examples will be obvious to those of ordinary skill in the art having the benefit of this disclosure. Thus, in one or more embodiments, the full operational access allows more access to the features, the applications, or the data of the electronic device than either the first additional operational access or the second additional operational access.

It should be noted that the various security levels which require predefined mien expression as shown in FIG. 6 may only require the expression of those miens once during an interactive session between the authorized user and the electronic device. Illustrating by example, in some embodiments the security level may be rolled back after some amount of time after a person has authenticated himself or herself as the authorized user of the electronic device. Continuing the example from the previous paragraph where the electronic device has only three levels—a privacy mode of operation, a semi-private mode of operation, and a normal mode of operation—that correspond, respectfully to only two predefined miens and a simple facial recognition, once the authorized user has expressed the predefined mien allowing access to the normal mode of operation, they may not be required to do so again until the electronic device is locked or otherwise secured.

Figure 7:
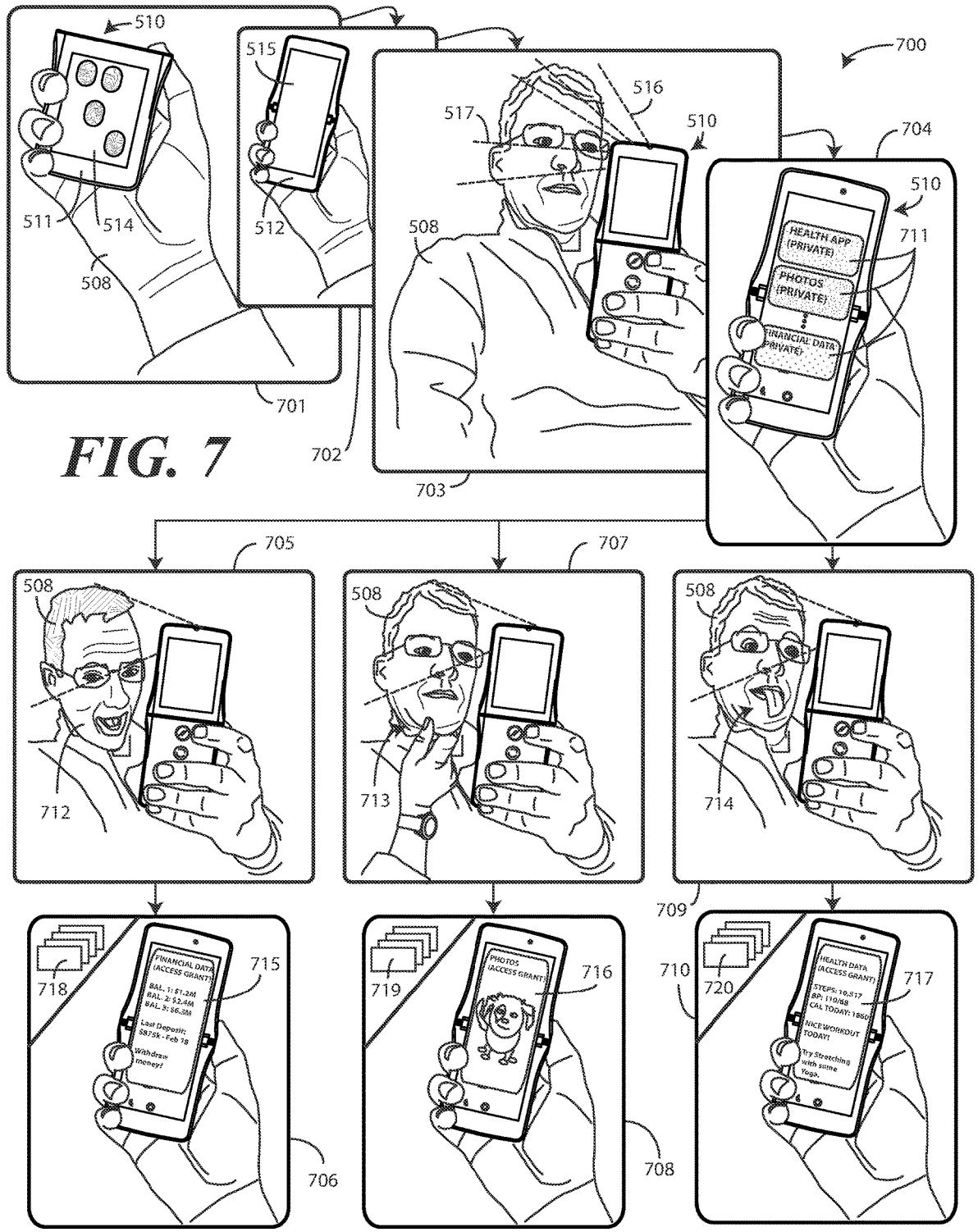
FIG. 7 illustrates yet another method in accordance with one or more embodiments of the disclosure.

Turning now to FIG. 7, illustrated therein is a method 700 similar to that described above with reference to FIG. 6, but that allows a user to actually choose which application, feature, or data to interact with simply by expressing a mien. Beginning with step 701, a user 508 is holding an electronic device 510. In this illustrative embodiment, the electronic device 510 comprises a first device housing 511 separated by a hinge 513 from a second device housing 512, which is shown at step 702. In one or more embodiments, the first device housing 511 is pivotable about the hinge 513 relative to the second device housing 512 from a closed position, shown at step 701 to an axially displaced open position, which is shown at steps 702-710.

At step 701, the user 508 holding the electronic device 510 while the electronic device 510 is in the closed position. An exterior display 514 is disposed on the exterior side of the first device housing 511 is exposed and visible. An interior display 515, shown at step 702, is concealed when the electronic device 510 is in the closed position due to the fact that the interior surfaces of the first device housing 511 and the second device housing 512, along which interior display 515 is disposed, abut when the electronic device 510 is in the closed position.

At step 702, the user 508 pivots the first device housing 511 relative to the second device housing 512 about the hinge 513 to the axially displaced open position. At step 703, an imager of the electronic device 510 captures at least one image of the user 508. In this example, the imager of the electronic device 510 captures a plurality of images 516,517 of the user 508. Thereafter, one or more processors of the electronic device 510 compare, at step 702, at least one image of the plurality of images 516,517 with one or more predefined reference images. The one or more processors can optionally also determine, at step 702, whether there is movement between at least two images of the plurality of images 516,517 as previously described.

In one or more embodiments, at step 702 the one or more processors perform a facial recognition process by determining, by comparing the at least one image of the plurality of images with the one or more predefined reference images, whether the at least one image sufficiently corresponds to the one or more predefined reference images. In this illustrative example it does, so the one or more processors grant limited operational access to features, applications, and/or data of the electronic device 510 at step 704.

In this illustrative example, the limited operational access granted at step 503 allows the user to see user actuation targets 711 representing interactive application portals of one or more predefined applications operating on the one or more processors of the electronic device 510. However, the limited operational access does not allow the user 508 to access the interactive application portals. To do this, the user 508 must express a mien.

In one or more embodiments, in addition to granting additional operational access to features, applications, or data of the electronic device 510, which in this embodiment includes granting access to the interactive application portals, expression of a mien selects the interactive application portal as well. For example, at step 705 the user 508 is expressing a first mien 712 by opening his mouth while making a smiling motion. As before, the one or more processors of the electronic device 510 determine, by comparing the at least one image captured at step 705 with the one or more predefined reference images, whether the at least one image comprises a depiction of a mien 712 expressed by the object. Since it does, and since the object is authenticated as the authorized user of the electronic device 510, step 706 selects a first interactive application portal 715 and grants access to the interactive application portal 715 and its underlying application and data. In this example, the first mien 712 selects, and grants access to, a financial application. Alternatively, the first mien 712 may select, and grant access to, a first suite 718 of applications or features as previously described.

Similarly, at step 707 the user 508 is expressing a second mien 713 by grabbing his chin with a thumb and forefinger. In one or more embodiments, the one or more processors of the electronic device 510 determine, by comparing the at least one image captured at step 707 with the one or more predefined reference images, whether the at least one image comprises a depiction of a mien 713 expressed by the object. Since it does, and since the object is authenticated as the authorized user of the electronic device 510, step 708 selects a second interactive application portal 716 that is different from the interactive application portal 715 of step 706. Step 708 also grants access to the second interactive application portal 716 and its underlying application and data. In this example, the second mien 713 selects, and grants access to, a photo gallery application. Alternatively, the second mien 713 may select, and grant access to, a second suite 719 of applications or features as previously described.

At step 709, the user 508 is expressing a third mien 714 by sticking his tongue out. In one or more embodiments, the one or more processors of the electronic device 510 determine, by comparing the at least one image captured at step 709 with the one or more predefined reference images, whether the at least one image comprises a depiction of a mien 714 expressed by the object. Since it does, and since the object is authenticated as the authorized user of the electronic device 510, step 710 selects a third interactive application portal 717 that is different from either the interactive application portal 715 of step 706 or the interactive application portal 716 of step 708. Step 709 also grants access to the third interactive application portal 717 and its underlying application and data. In this example, the third mien 714 selects, and grants access to, a health application. Alternatively, the third mien 714 may select, and grant access to, a third suite 720 of applications or features as previously described.

Thus, in one or more embodiments the method 700 of FIG. 7 expands on the method (600) of FIG. 6 by not only granting additional access to applications, features, or data of the electronic device 510 upon expression of a mien, but also by selecting which application, feature, or data to grant access to in response to detecting a predefined mien that is associated with an application, feature, or data, and is distinct from other predefined miens associated with other applications, features, or data of the electronic device 510.

Figure 8:
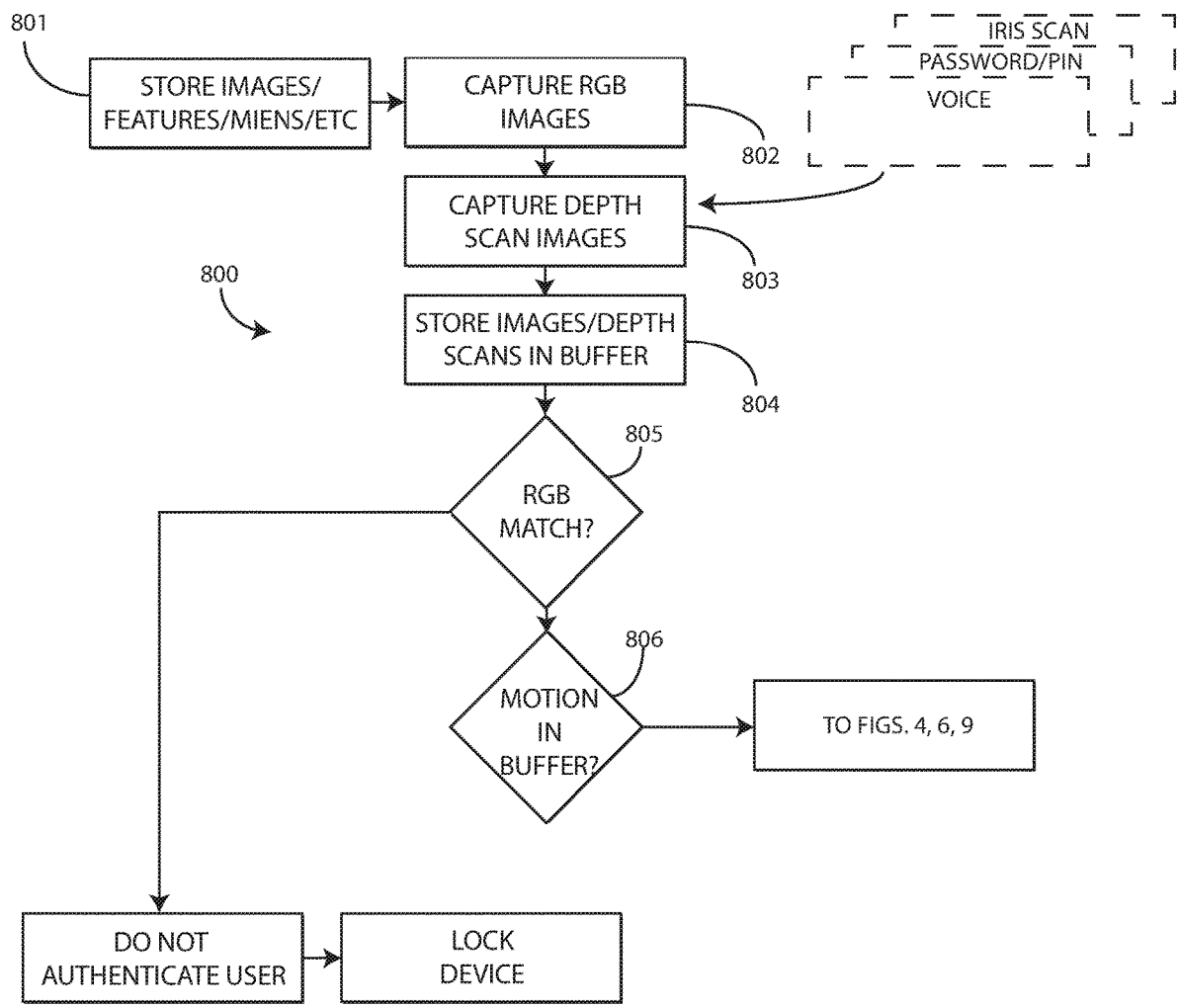
FIG. 8 illustrates another method in accordance with one or more embodiments of the disclosure.

Turning now to FIG. 8, illustrated therein is another method 800 configured in accordance with one or more embodiments of the disclosure. The method 800 of FIG. 8 uses motion as a trigger to perform the mien detection process. While the method 800 of FIG. 8 uses mien detection as an authentication process allowing additional access to an electronic device, it should be noted that rather than a mien the method 800 could detect a predefined voice using voice authentication, a unique identifier such as a password, personal identification number, or passcode, or the iris of an authorized user using iris scanning as indicated by the dashed line boxes that can be substituted for step 803 in other embodiments. Other examples of how the method 800 of FIG. 8 could be used will be obvious to those of ordinary skill in the art having the benefit of this disclosure. The same is true for the methods of FIGS. 9 and 11.

Beginning at optional step 801, the method 800 optionally includes storing, as one or more predefined reference images in a memory of an electronic device, predefined facial features of an authorized user of the electronic device. These predefined facial features include a predefined mien in one or more embodiments, as noted above. The predefined facial features may be stored by capturing one or more training images, one or more training facial scans, or combinations thereof.

At step 802, the method 800 includes capturing, with an imager, a plurality of images of an object such as a person who is within a vicinity of the electronic device. Step 803 comprises storing the plurality of images captured at step 802 in a circular buffer of the electronic device. In one or more embodiments, step 803 comprises replacing a least recent image of the plurality of images with most recent image of the plurality of images. Thus, in one or more embodiments the imager at step 802 can continually capture images, with those images being stored in a circular buffer at step 803 having a finite number of images stored therein, with images being replaced on a last-in-first-out basis.

At decision 804, the method 800 compares the at least one image captured at step 802 with the one or more predefined reference images. At step 805, where the at least one image sufficiently corresponds to the one or more predefined reference images, the method 800 authenticates the person as an authorized user of the electronic device, unlocks the device, thereby providing the authorized user with access to the operating system of the electronic device, and grants limited operational access to features, applications, or data of the electronic device as previously described. In one or more embodiments, the limited operational access granted at step 805 defines a privacy mode of operation of the electronic device. In one or more embodiments, the privacy mode of operation of the electronic device allows access only to notifications generated by one or more predefined applications operating on the one or more processors.

Figure 9:
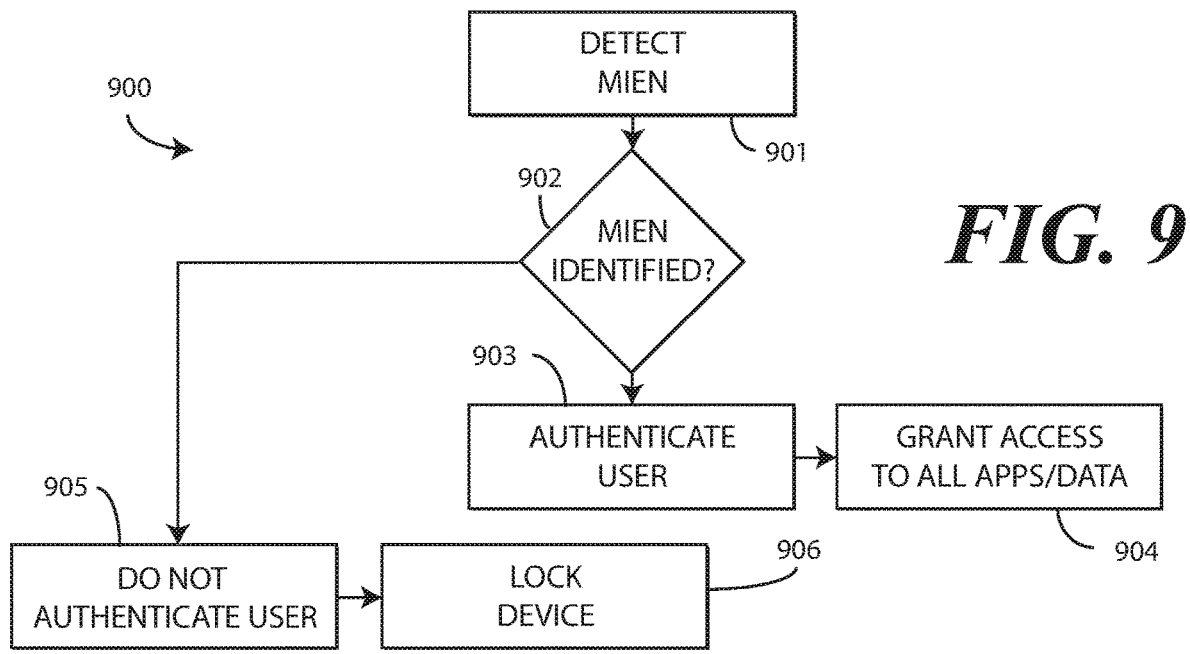
FIG. 9 illustrates another method in accordance with one or more embodiments of the disclosure.

At decision 806, the method 800 determines whether there is movement of the object between at least two images of the plurality of images as a trigger for a mien detection process, which can be performed in accordance with any of FIGS. 4, 6, and 9. In one or more embodiments, decision 804 occurs prior to decision 806, with the at least one image used for comparison at decision 804 occurring before the one or more images used for detecting motion at decision 806 in the plurality of images. In one or more embodiments, the mien detection operation of decision 806 that determines whether the one or more images comprise a depiction of a predefined mien expressed by the object occurs only when the depiction of the predefined mien is absent from the at least one image of the plurality of images used for facial recognition at decision 804.

Turning now to FIG. 9, illustrated therein is a method 900 depicting one illustrative mien detection operation that can follow either FIG. 3 or FIG. 9 in accordance with embodiments of the disclosure. At step 901, the method 900 performs a mien detection operation on one or more images to determine whether the one or more images comprise a depiction of one or more miens expressed by an object depicted in the one or more images. Decision 902 then determines whether the mien detected at step 901 comprises a predefined mien associated with a feature, application, or data set of an electronic device.

Where it does, step 903 authenticates the object as an authorized user of the electronic device. Step 904 then grants full operational access to the features, the applications, or the data of the electronic device. In one or more embodiments, the full operational access defines a normal mode of operation of the electronic device where access to all applications, all features, and all data is allowed.

By contrast, when no predefined mien is detected or identified, but where a facial recognition operation, e.g., the method (300) of FIG. 3, has authenticated a user as an authorized user of the electronic device, but the one or more images fail to comprise the depiction of the predefined mien expressed by the object, step 905 grants limited operational access to features, applications, or data of the electronic device. In one or more embodiments, this limited operational access is only to a private operating mode of the electronic device. Optionally, at step 906, the method 900 can simply lock the electronic device.

Figure 10:
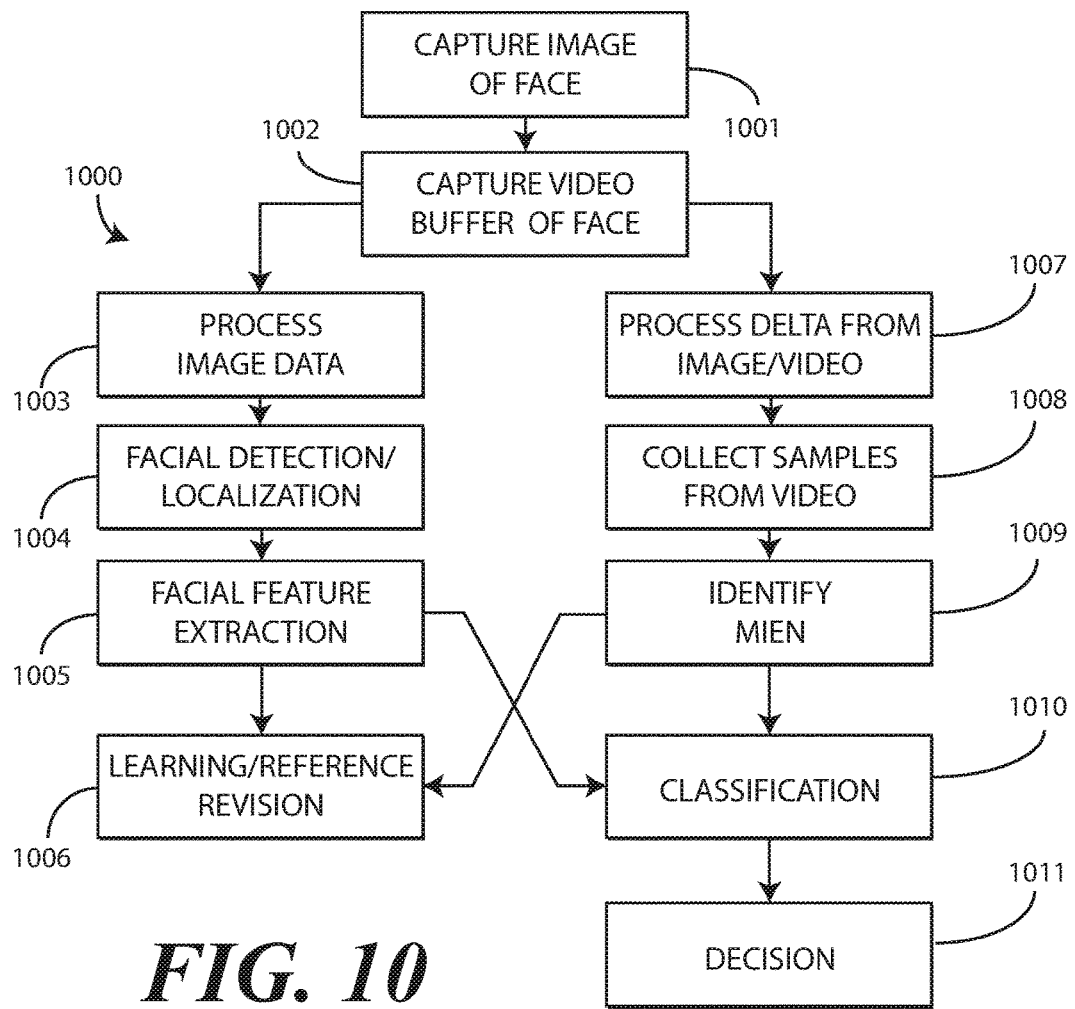
FIG. 10 illustrates still another method in accordance with one or more embodiments of the disclosure.

Turning now to FIG. 10, illustrated therein is yet another method 1000 in accordance with one or more embodiments of the disclosure. Beginning at step 1001, an imager of an electronic device captures at least one image of the face of a user. At step 1002, the imager captures a plurality of images, in the form of video, and stores the plurality of images in a circular buffer of the electronic device. In one or more embodiments, the circular buffer stores about one second of video. This amount of storage is illustrative only, as other amounts that are greater than, or less than, one second will be obvious to those of ordinary skill in the art having the benefit of this disclosure.

At step 1003, and the steps that follow, a facial recognition operation is performed. Beginning at step 1003, one or more processors of the electronic device begin to process image data from the at least one image captured at step 1001. This can include extracting color, brightness, hue, saturation, and other data from one or more pixels of the at least one image. At step 1004, the one or more processors use this extracted information to identify where a face is located within the image. Step 1004 can include identifying the outline of the face so as to delineate the face from background portions of the image, and so forth.

At step 1005, facial features are extracted from the face identified at step 1004. For example, a face analyzer configured with optical and/or spatial recognition can identify objects along the face, e.g., eyes, nose, mouth, etc., using image recognition, character recognition, visual recognition, facial recognition, color recognition, shape recognition, and the like. The face analyzer can then compare these features with corresponding features included in one or more predefined authentication reference images stored in a memory of the electronic device. This comparison, in one or more embodiments, is used to confirm beyond a threshold authenticity probability that the person's face in the image sufficiently matches one or more of the reference images.

Step 1010 then classifies the person from the image as either an authorized user of the electronic device or someone other than an authorized user of the electronic device. Where the person is classified at step 1010 as an authorized user of the electronic device, step 1011 comprises granting limited operational access to features, applications, or data of the electronic device. For example, step 1011 can comprise placing the electronic device in a privacy mode of operation, thereby allowing access to only limited features, applications, or data of the electronic device.

In parallel, step 1007 and the steps thereafter perform a mien identification operation. Beginning at step 1007, differences between the at least one image captured at step 1001 and the plurality of images captured at step 1002 are identified, determined, and classified. In one or more embodiments, this allows the mien identification operation to determine whether there is movement of the face between at least two images of the plurality of images. In some embodiments, the mien detection operation on one or more images of the plurality of images occurs only when there is movement within the plurality of images. In other embodiments, the one or more processors will attempt to identify a mien regardless of whether there is movement in the plurality of images. Using the former technique conserves computational resources in situations where an authorized user only wants to use basic features of the electronic device.

At step 1008, facial and body features are extracted from the plurality of images in a similar fashion to that described with reference to step 1005. Step 1009 determines whether a predefined mien can be identified from the plurality of images.

Where a predefined mien can be identified from the plurality of images, step 1010 comprises associating the identified predefined mien with an application, feature, and/or data of the electronic device. For example, in one or more embodiments a single mien can be used to allow an authorized user to obtain full access to the electronic device. However, as noted above, in other embodiments a plurality of miens can be used to gradually grant increasing amounts of access to the electronic device.

Where a predefined mien can be identified from the plurality of images at step 1009, and classified at step 1010, the decision making at step 1011 changes. Rather than only providing limited operational access, step 1011 can grant additional operational access or full operational access as a function of the mien. In one or more embodiments, when the at least one image captured at step 1001 identifies the person in the image as the authorized user of the electronic device, such as when the at least one image sufficiently corresponds to the one or more predefined reference images, and where the plurality of images captured at step 1002 fail to comprise the depiction of the predefined mien expressed by the person, step 1011 still comprises granting, by the one or more processors, limited operational access to features, applications, or data of the electronic device. However, when the at least one image captured at step 1001 identifies the person in the image as the authorized user of the electronic device, such as when the at least one image sufficiently corresponds to the one or more predefined reference images, and where the plurality of images comprise the depiction of the predefined mien expressed by the person, step 1011 can comprise granting, by the one or more processors, full operational access to the features, the applications, or the data of the electronic device.

Optional step 1006 allows for training of the predefined reference images or other stored information used to identify one or both of the authorized user and/or the predefined mien. For example, a neural network can use minor differences between captured images and predefined reference images to augment its stored mathematical representations of these predefined reference images to allow these models to continue to identify the authorized user despite changes in, for example, facial hair, makeup, and so forth.

Figure 11:
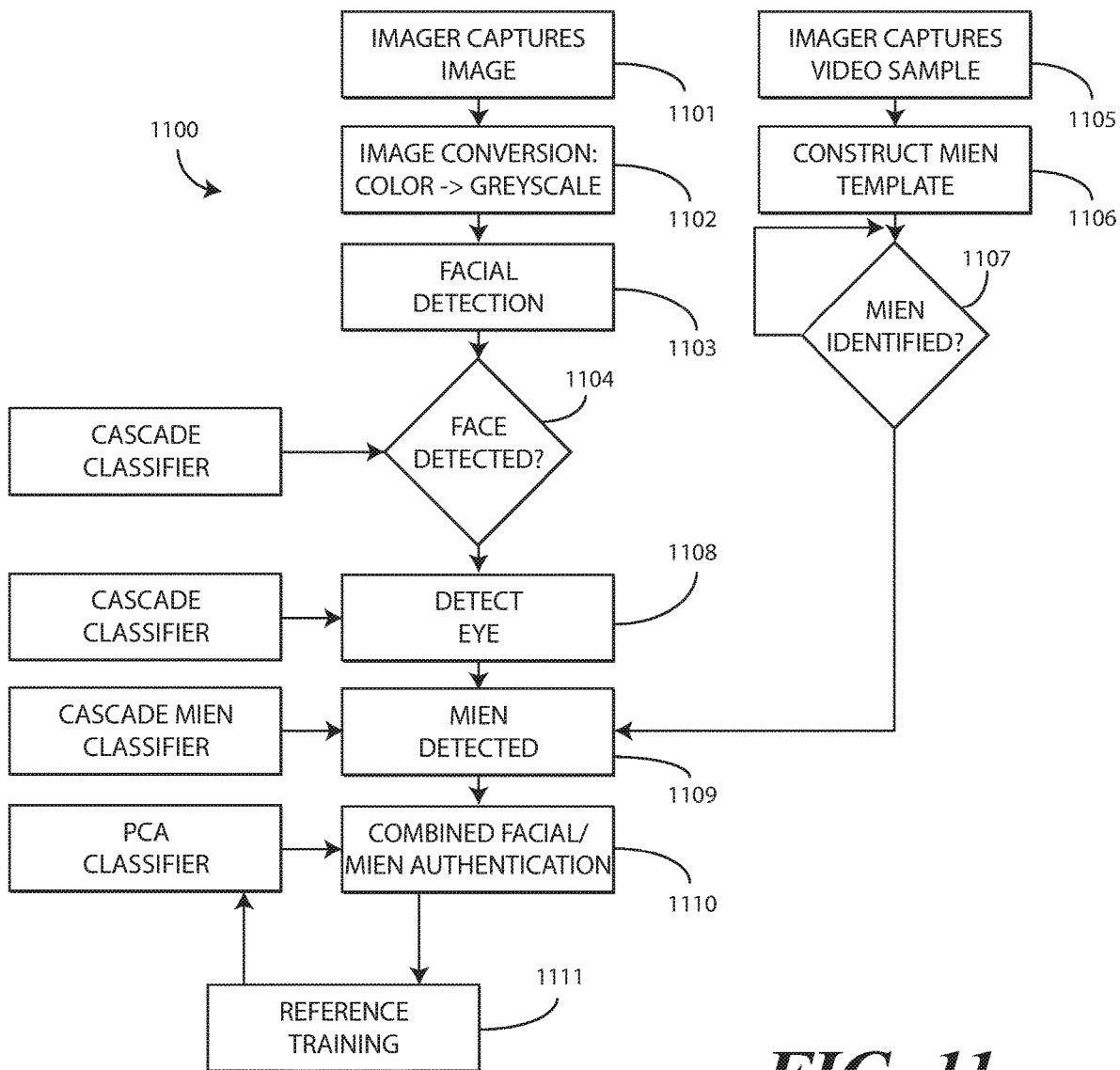
FIG. 11 illustrates yet another method in accordance with one or more embodiments of the disclosure.

Turning now to FIG. 11, illustrated therein is another method 1100 configured in accordance with one or more embodiments of the disclosure. Beginning at step 1101, an imager of an electronic device captures at least one image of the face of a user. At step 1102, one or more processors of the electronic device convert the at least one image from a color image to a greyscale image.

At step 1103, a facial recognition operation is performed. At step 1003, one or more processors of the electronic device process image data from the at least one image captured at step 1101 and converted at step 1102. This can include extracting facial features, such as by using a face analyzer configured with optical and/or spatial recognition to identify objects along the face, e.g., eyes, nose, mouth, etc., using image recognition, character recognition, visual recognition, facial recognition, color recognition, shape recognition, and the like. Whether a face can be detected is determined at decision 1104. In one or more embodiments, decision 1104 uses a cascade classifier comprising one or more predefined reference images or other mathematical models to identify the face from the at least one image captured at step 1101 and converted at step 1102. Optional step 1108 can perform an operation similar to that described at step 1103, but with step 1108 detecting an eye as a reference point within the image.

Meanwhile, at step 1105 the imager captures a plurality of images, in the form of video, and stores the plurality of images in a circular buffer of the electronic device. Step 1106 performs a mien detection process by constructing a mien template. Decision 1107 compares the mien template to the plurality of images to determine whether a mien is present within the plurality of images. Where it is, step 1109 attempts to identify the mien as a predefined mien. As with step 1108 and decision 1104, in one or more embodiments step 1109 uses a cascade classifier comprising one or more predefined reference images, one or more predefined authentication references, and/or other mathematical models to identify the mien extracted from the plurality of images captured at step 1105.

Step 1110 then classifies the person from the image as either an authorized user of the electronic device or someone other than an authorized user of the electronic device. Where the person is classified at step 1110 as an authorized user of the electronic device, step 1110 comprises granting limited operational access to features, applications, or data of the electronic device. For example, step 1110 can comprise placing the electronic device in a privacy mode of operation, thereby allowing access to only limited features, applications, or data of the electronic device. Alternatively, when the at least one image captured at step 1101 identifies the person in the image as the authorized user of the electronic device, and where the plurality of images captured at step 1105 comprise the depiction of the predefined mien expressed by the object, step 1110 can comprise granting, by the one or more processors, full operational access to the features, the applications, or the data of the electronic device. As before, optional step 1111 can comprise training of the predefined reference images or other stored information used to identify one or both of the authorized user and/or the predefined mien.

Figure 12:
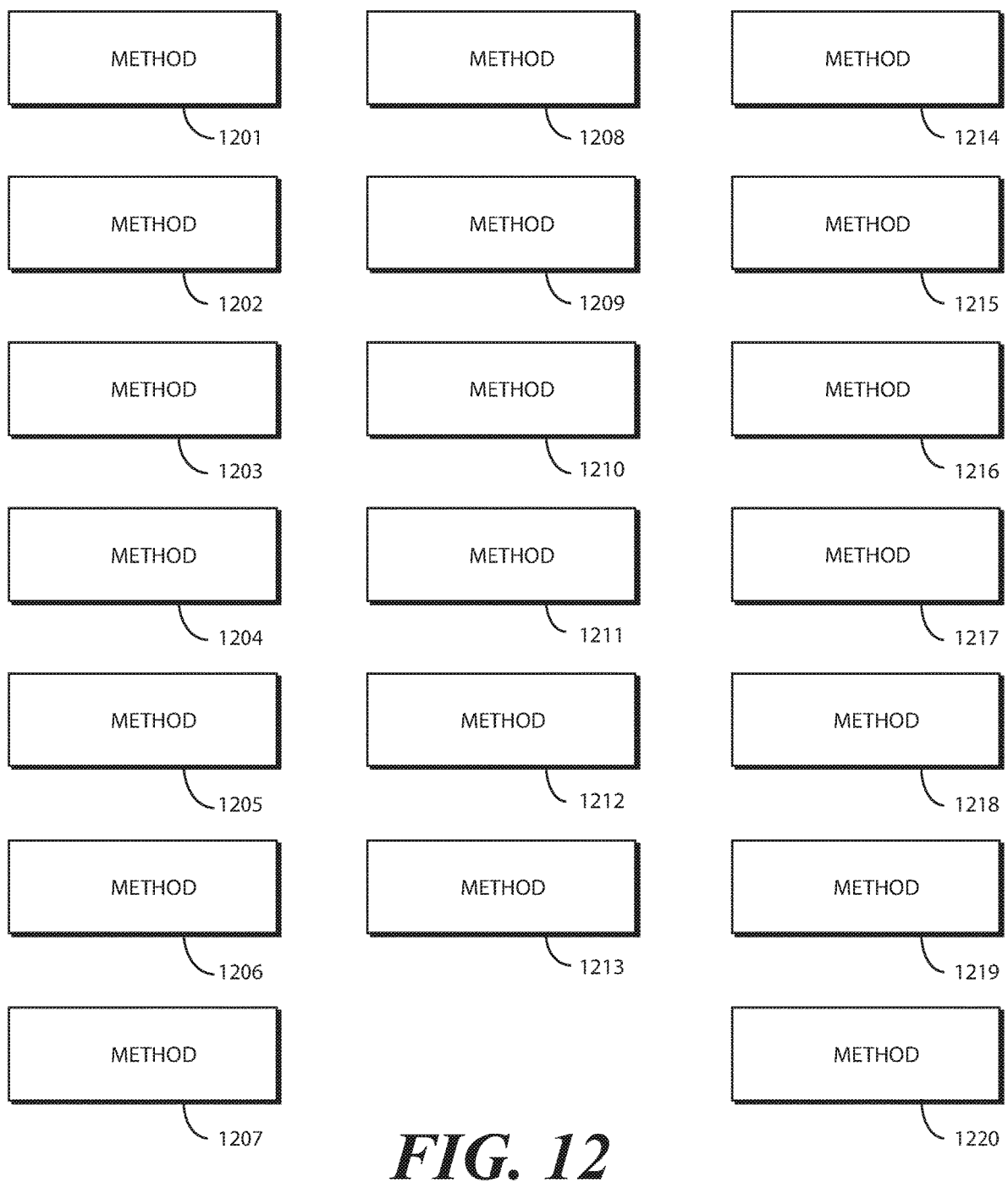
FIG. 12 illustrates various embodiments of the disclosure.

Turning now to FIG. 12, illustrated therein are various embodiments of the disclosure. At 1201, a method in an electronic device comprises capturing, with an imager, at least one image of an object. At 1201, the method comprises comparing, with one or more processors, the at least one image with one or more predefined reference images.

At 1201, the method comprises determining, with the one or more processors by comparing the at least one image with the one or more predefined reference images, whether the at least one image comprises a depiction of a mien expressed by the object. At 1201, and when the at least one image sufficiently corresponds to the one or more predefined reference images, the method comprises authenticating, by the one or more processors, the object as an authorized user of the electronic device.

At 1201, and when the object is authenticated as the authorized user of the electronic device and the at least one image fails to comprise the depiction of the mien expressed by the object, the method comprises granting, by the one or more processors, limited operational access to features, applications, or data of the electronic device. Alternatively, at 1201, and when the object is authenticated as the authorized user of the electronic device and the at least one image comprises the depiction of the mien expressed by the object, the method comprises granting, by the one or more processors, full operational access to the features, the applications, or the data of the electronic device.

At 1202, the mien of 1201 comprises an intentional facial pose. At 1203, the at least one image of 1201 comprises a plurality of images. At 1203, the method of 1201 further comprises determining, by the one or more processors, whether there is movement of the object between at least two images of the plurality of images. At 1203, the determining whether the at least one image comprises the depiction of the mien expressed by the object of 1201 occurs only when there is the movement of the object between the at least two images of the plurality of images.

At 1204, the limited operational access of 1201 allows access to one or more notifications generated by one or more predefined applications operating on the one or more processors, and precludes access to interactive application portals of the one or more predefined applications operating on the one or more processors. At 1205, the full operational access of 1204 allows access to the interactive application portals of the one or more predefined applications operating on the one or more processors.

At 1206, the limited operational access of 1201 defines a privacy mode of operation of the electronic device. At 1207, the full operational access of 1206 defines a normal mode of operation of the electronic device.

At 1208, the electronic device of 1201 further comprises a first device housing that is pivotable about a hinge relative to a second device housing between a closed position and an axially displaced open position. At 1208, the granting the full operational access to the features, the applications, or the data of the electronic device occurring only when the first device housing is pivoted about the hinge relative to the second device housing to the axially displaced open position.

At 1209, the electronic device of 1201 further comprises a first device housing pivotable about a hinge relative to a second device housing between a closed position and an axially displaced open position. At 1209, the determining whether the at least one image comprises the depiction of the mien expressed by the object is triggered by the first device housing pivoting about the hinge relative to the second device housing from the closed position to the axially displaced open position.

At 1210, a method in an electronic device comprises capturing, with an imager, a plurality of images of an object. At 1210, the method comprises comparing, with one or more processors, at least one image of the plurality of images with one or more predefined reference images.

At 1210, the method comprises determining, with one or more processors, whether there is movement of the object between at least two images of the plurality of images. At 1210, and only where there is the movement of the object between the at least two images of the plurality of images, the method comprises performing, by the one or more processors, a mien detection operation on one or more images of the plurality of images to determine whether the one or more images comprise a depiction of a predefined mien expressed by the object.

At 1210, and when the at least one image sufficiently corresponds to the one or more predefined reference images and the one or more images fail to comprise the depiction of the predefined mien expressed by the object, the method comprises granting, by the one or more processors, limited operational access to features, applications, or data of the electronic device. At 1210, and when the at least one image sufficiently corresponds to the one or more predefined reference images and the one or more images comprise the depiction of the predefined mien expressed by the object, the method comprises granting, by the one or more processors, full operational access to the features, the applications, or the data of the electronic device.

At 1211, the at least one image of 1210 occurs before the one or more images in the plurality of images. At 1212, the method of 1211 further comprises storing the plurality of images in a circular buffer, At 1212, a most recent image of the plurality of images replaces a least recent image of the plurality of images in the circular buffer.

At 1213, the performing of 1210, by the one or more processors, of the mien detection operation on one or more images of the plurality of images occurs only when the depiction of the predefined mien is absent from the at least one image of the plurality of images. At 1214, the limited operational access of 1210 defines a privacy mode of operation of the electronic device, while the full operational access defining a normal mode of operation of the electronic device. At 1215, the privacy mode of operation of the electronic device of 1214 allows access only to notifications generated by one or more predefined applications operating on the one or more processors.

At 1216, a method in an electronic device comprises capturing, with an imager, a plurality of images of an object. At 1216, the method comprises comparing, with one or more processors, at least one image of the plurality of images with one or more predefined reference images. At 1216, the method comprises performing, by the one or more processors, a mien detection operation on one or more images of the plurality of images to determine whether the one or more images comprise a depiction of one or more predefined miens expressed by the object.

At 1216, and when the at least one image sufficiently corresponds to the one or more predefined reference images and the one or more images fail to comprise the depiction of the one or more predefined miens expressed by the object, the method comprises granting, by the one or more processors, limited operational access to features, applications, or data of the electronic device. At 1216, and when the at least one image sufficiently corresponds to the one or more predefined reference images and the one or more images comprise the depiction of a first predefined mien expressed by the object, the method comprises granting, by the one or more processors, a first additional operational access to the features, the applications, or the data of the electronic device. At 1216, and when the at least one image sufficiently corresponds to the one or more predefined reference images and the one or more images comprise the depiction of a second predefined mien expressed by the object, the method comprises granting, by the one or more processors, a second additional operational access to the features, the applications, or the data of the electronic device.

At 1217, the first operational access and the second operational access of 1216 allow access to different features, applications, or data of the electronic device. At 1218, the first operational access of 1217 allows access to a first interactive application portal of a first predefined application operating on the electronic device, and the second additional operational access allows access to a second interactive application portal of a second predefined application operating on the electronic device.

At 1218, and further when the at least one image sufficiently corresponds to the one or more predefined reference images and the one or more images comprise the depiction of a third predefined mien expressed by the object, the method of 1216 comprises granting, by the one or more processors, full operational access to the features, the applications, or the data of the electronic device. At 1220, and the full operational access of 1219 allows more access to the features, the applications, or the data of the electronic device than either the first additional operational access or the second additional operational access.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

For example, in one or more embodiments one or more processors of an electronic device can utilize facial recognition to unlock and grant full operational access to the electronic device. However, the one or more processors may require that the mien be expressed periodically to maintain the full operational access to the electronic device. In still other embodiments, an authorized user can select a mien when enrolling into the facial biometrics of the electronic device, with the facial recognition components of the electronic device requiring expression of the mien to initially authenticate the user as the authorized user of the electronic device.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
a first device housing separated by a hinge from a second device housing;
an exterior display;
an imager; and
one or more processors operable with the imager;
wherein, in response to the imager capturing at least one image of an object, the one or more processors determine, by comparing the at least one image with one or more predefined reference images, whether the at least one image comprises a depiction of a mien expressed by the object; and
when the at least one image sufficiently corresponds to the one or more predefined reference images, authenticate the object as an authorized user of the electronic device; and
when the object is authenticated as the authorized user of the electronic device and the at least one image fails to comprise the depiction of the mien expressed by the object, grant limited operational access to features, applications, or data of the electronic device; or
when the object is authenticated as the authorized user of the electronic device and the at least one image comprises the depiction of the mien expressed by the object, grant full operational access to the features, the applications, or the data of the electronic device;
the limited operational access allows access to one or more notifications generated by one or more predefined applications operating on the one or more processors and accessible when the first device housing is rotated relative to the second device housing to a closed position and precludes access to interactive application portals of the one or more predefined applications operating on the one or more processors;
further wherein:
user interaction with at least one user actuation target corresponding to at least one notification for at least a predetermined amount of time causes the imager to capture the at least one image of the object and the one or more processors to compare the at least one image to the one or more predefined reference images;
the limited operational access exposes content of the notification, a response user interactive element, and a dismissal interactive element; and
access to the response user interactive element and the dismissal interactive element is not granted until the full operational access is granted.

2. The electronic device of claim 1, the electronic device further comprising an interior display that is concealed when the electronic device is in the closed position and revealed when the electronic device is in an axially displaced open position.

3. The electronic device of claim 2, wherein the interactive application portals are only accessible when the first device housing is rotated relative to the second device housing to an axially displaced open position.

4. The electronic device of claim 1, the one or more notifications each comprising a user actuation target, with a shape of the user actuation target identifying a corresponding application from which the one or more notifications were received.

5. The electronic device of claim 1, wherein:
the interactive application portals are initially presented as a plurality of interactive application portals in a stacked arrangement;
thereafter, in response to other user interaction with a selected interactive application portal, only the selected interactive application portal is presented; and
the selected interactive application portal has at least one dimension that expands in response to the other user interaction.

6. The electronic device of claim 1, wherein the exterior display is disposed on an exterior side of the first device housing such that the exterior display is visible and exposed when the electronic device is in the closed position;
wherein:
the one or more notifications are represented by one or more user actuation target presented on the exterior display when the electronic device is closed; and
the limited operational access allows access to the one or more notifications generated by one or more predefined applications operating on the one or more processors when the electronic device is closed and after user interaction expanding at least one user actuation target to reveal content of at least one notification corresponding to the at least one user actuation target.

7. The electronic device of claim 1, wherein the one or more processors, in response to failing to determine the at least one image comprises the depiction of the mien expressed by the object, cause a prompt to be presented requesting expression of the mien.

8. The electronic device of claim 1, wherein:
the at least one image comprises a plurality of images; and
the one or more processors:
store the plurality of images in a circular buffer;
extract one or more of color, brightness, hue, and/or saturation from the at least one image to identify where a face is located within the image by identifying an outline of the face from background portions of the at least one image;
extract facial features from the at least one image; and
classify the face using the facial features extracted from the at least one image.

9. The electronic device of claim 1, wherein:
the exterior display is attached to the first device housing such that the exterior display is exposed when the electronic device is in the closed position; and
the one or more processors determine whether the at least one image comprises the depiction of the mien expressed by the object in response to a finger touching the exterior display for at least a predetermined amount of time while the electronic device is in the closed position.

10. The electronic device of claim 1, the mien comprising an intentional facial pose.

11. The electronic device of claim 1, wherein the full operational access allows access to interactive application portals of one or more applications operating on the one or more processors.

12. The electronic device of claim 1, the limited operational access defining a privacy mode of operation of the electronic device.

13. The electronic device of claim 1, the full operational access defining a normal mode of operation of the electronic device.

14. An electronic device, comprising a first device housing separated from a second device housing by a hinge;
an imager; and
one or more processors operable with the imager;
wherein:
when the first device housing is pivoted about the hinge to a closed position and a user interacts with at least one user actuation target corresponding to at least one notification for at least a predetermined amount of time, the imager captures a plurality of images of an object and the one or more processors, simultaneously, compare at least one image of the plurality of images with one or more predefined reference images;
the one or more processors perform a mien detection operation on one or more images of the plurality of images to determine whether the one or more images comprise a depiction of a predefined mien expressed by the object; and when the at least one image sufficiently corresponds to the one or more predefined reference images and the one or more images fail to comprise the depiction of the predefined mien expressed by the object, the one or more processors permit peek access allowing content of a notification to be seen while the electronic device is in the closed position while precluding interaction with interactive elements of the notification; or
when the at least one image sufficiently corresponds to the one or more predefined reference images and the one or more images comprise the depiction of the predefined mien expressed by the object, the one or more processors permit interaction with the interactive elements of the notification while the electronic device is in the closed position;
further wherein:
preclusion of interaction with the interactive elements of the notification still exposes content of the notification, a response user interactive element, and a dismissal interactive element; and
permission of interaction with the interactive elements allows access to the response user interactive element and the dismissal interactive element.

15. The electronic device of claim 14, further comprising an exterior display that is exposed when the electronic device is in the closed position, wherein:
the one or more processors presenting a user actuation target representing the notification on the exterior display; and
the user actuation target conceals the content.

16. The electronic device of claim 14, wherein the peek access reveals the interactive elements of the notification precluded from interaction when the at least one fails to comprise the depiction of the predefined mien expressed by the object.

17. The electronic device of claim 14, wherein the predefined mien comprises a tongue sticking out.

18. The electronic device of claim 14, further comprising an exterior display that is exposed when the electronic device is in the closed position.

19. The electronic device of claim 14, the at least one image occurring before the one or more images in the plurality of images.

20. The electronic device of claim 14, wherein the plurality of images are stored in a circular buffer with a most recent image of the plurality of images replacing a least recent image of the plurality of images in the circular buffer.

* * * * *